(12) United States Patent
Shteynberg et al.

(10) Patent No.: US 7,149,097 B1
(45) Date of Patent: Dec. 12, 2006

(54) AC/DC CONVERTER WITH POWER FACTOR CORRECTION

(75) Inventors: Anatoly Shteynberg, San Jose, CA (US); Harry Rodriguez, Gilroy, CA (US)

(73) Assignee: SynDiTec, Inc., Gilroy, CA (US)

( * ) Notice: Subject to any disclaimer, the term of this patent is extended or adjusted under 35 U.S.C. 154(b) by 0 days.

(21) Appl. No.: 11/206,356

(22) Filed: Aug. 17, 2005

(51) Int. Cl.
*H02M 5/42* (2006.01)
*H02M 3/335* (2006.01)

(52) U.S. Cl. .......................................... 363/16; 363/89

(58) Field of Classification Search ................. 363/16, 363/89, 127
See application file for complete search history.

(56) References Cited

U.S. PATENT DOCUMENTS

| | | | |
|---|---|---|---|
| 5,438,499 | A | 8/1995 | Bonte et al. |
| 5,757,625 | A | 5/1998 | Schoofs |
| 5,757,626 | A * | 5/1998 | Jovanovic et al. ....... 363/21.04 |
| RE36,098 | E | 2/1999 | Vinciarelli |
| 5,991,172 | A | 11/1999 | Jovanovic et al. |
| 6,038,146 | A | 3/2000 | Luo et al. |
| 6,069,801 | A | 5/2000 | Hodge et al. |
| 6,108,218 | A | 8/2000 | Igarashi |
| 6,108,222 | A | 8/2000 | Liang |
| 6,272,027 | B1 | 8/2001 | Fraidlin et al. |

OTHER PUBLICATIONS

Chow et al., "A Novel Method for Elimination of Line—Current Harmonics in Single-Stage PFC Switching Regulators", IEEE Transactions on Power Electronics, vol. 13, No. 1, 1998, pp. 75-83.

* cited by examiner

*Primary Examiner*—Shawn Riley
(74) *Attorney, Agent, or Firm*—Fernandez & Associates, LLP

(57) ABSTRACT

A switch mode AC/DC converter with input current shaped for unity power factor. Input current is modulated by input voltage, and input inductor and isolation transformer are driven with the same duty ratio, with a low voltage across bulk capacitor. This voltage is determined only by input voltage amplitude. Energy stored in the leakage inductance of the transformer is returned back to the internal DC source. A soft switching circuit is connected to the primary side, eliminating the need for high side drive. Sources of the main and auxiliary switches and primary winding of the transformer are connected to ground for easy primary voltage sensing. Overvoltage protection circuit of the output is connected to exclusively primary side signals. Secondary synchronous rectifier is driven by a circuit synchronized with the system clock. The circuit can be coupled to either the primary or the secondary winding of the isolation transformer.

29 Claims, 24 Drawing Sheets

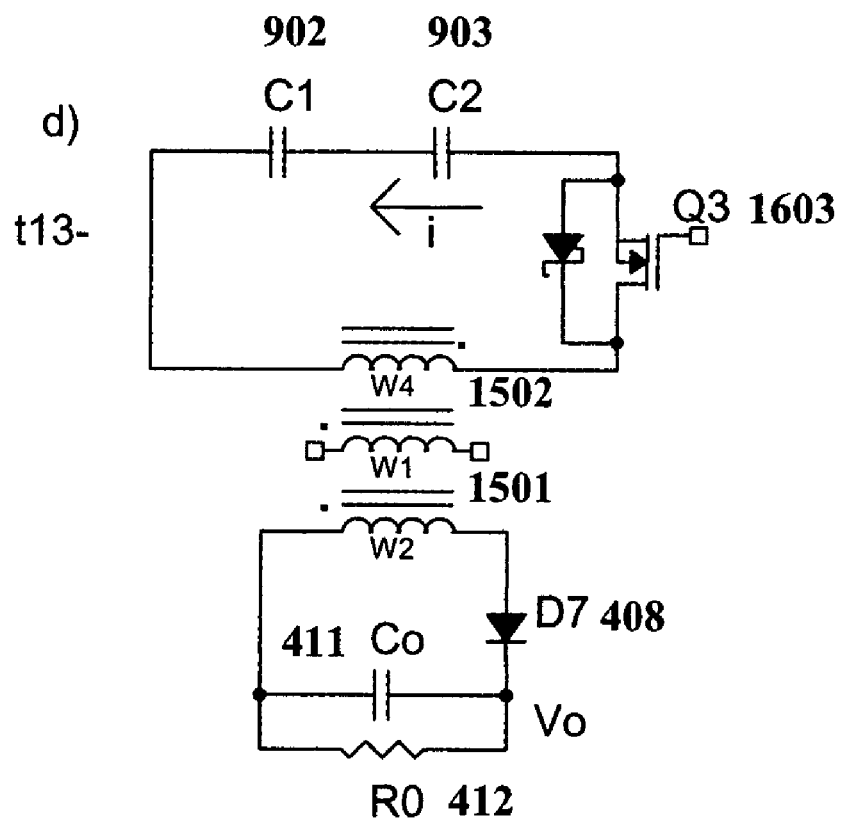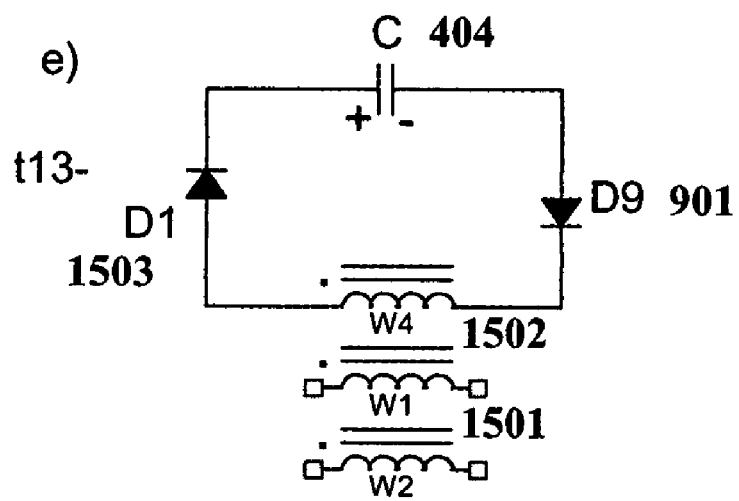
Fig. 17 (CON'T)

AC/DC CONVERTER WITH POWER FACTOR CORRECTION

FIELD

The present invention relates to AC/DC converters, and more particularly with single stage AC/DC converters with input current shaped to deliver a power factor equal to unity.

RELATED ART

Traditional switch mode AC/DC converters generate highly distorted AC current, which pollutes an AC line with high harmonics content. A conventional technique to correct this problem uses power factor correction or AC current shaping. The first power factor correction devices, which are widely used now, were constructed as a separate preregulator to form a front end AC/DC converter, which is followed by a main DC/DC converter. However, including an additional converter made the total system more complex, less efficient and pricey, though technically, the power factor was achieved close to unity.

Later, a single stage single switch power factor corrected AC/DC device was suggested. (See Richard Redl et al., "A New Family of Single-Stage Isolated Power Factor Correctors with Fast Regulation of the Output Voltage", IEEE PESC, 1994, pp. 1137–1144.) The schematic of this converter is presented in FIG. 1, and its current waveform is presented in FIG. 2.

From voltseconds balance of the inductor L:

$$D_1 = \frac{V_i D}{V_c} + nV_o - V_i \quad (1)$$

Average input current:

$$I_{av} = TD(D+D_1)\frac{V_i}{2L} = TD^2 \frac{V_i}{2L}\frac{(V_c + nV_o)}{V_i} \quad (2)$$

where T-period of the switching cycle,
 D is the Duty cycle of the positive slope,
 $D_1$ is the Duty cycle of the negative slope,
 $V_c$ is the Voltage across the bulk capacitor,
 $V_o$ is the Output voltage,
 n is the transformer ratio,
 $V_i$ is the instantaneous value of the input voltage.

The current becomes modulated by Vi or sin θt, or power factor=1 only when $V_c + nV_o/V_i \gg 1$. That condition leads designers to keep the voltage across the bulk capacitor C very high to avoid input current distortions.

A number of solutions was proposed to improve the single stage single switch isolated AC/DC converter with power factor correction:
U.S. Pat. No. 6,069,801 Hodge et al.
U.S. Pat. No. 6,038,146 Luo at al.
U.S. Pat. No. 6,272,027 Fraidlin et al.
U.S. Pat. No. 6,108,222 Liang
U.S. Pat. No. 6,108,218 Igarashi
U.S. Pat. No. 5,757,626 Jovanovic et al.
U.S. Pat. No. 5,991,172 Jovanovic et al.
Jun-Young Lee et al. "A New Single-Stage AC/DC Converter with High Efficiency and High Power Factor," INETELEC 1996, pp. 263–270.
M. Daniele et al., "A Single Stage Power Factor Corrected AC/DC Converter", INTELEC 1996, pp. 256–262
Chow et al., "A Novel Method for Elimination of Line-Current Harmonics in Single-Stage PFC Switching Regulators", IEEE Transactions on Power Electronics, Vol. 13, No 1, 1998, pp 75–83.

However these solutions either have not satisfactorily reduced the voltage stress on converter elements or introduced quite complex circuits for practical implementations. All of them present low frequency ripple at the output voltage due to the fact that in a single stage AC/DC converter, instantaneous input power is not equal to instantaneous output power, despite the fact that average input power and output power are balanced. To filter low frequency ripple, big capacitance values of the input bulk capacitor are required, which is expensive as it's a high voltage element. And even, if this capacitor is used, it still will not eliminate all low frequency ripple, making such a converter unacceptable for some specific applications, like voice processing systems in telecommunication.

Average current in the conventional circuit of FIG. 3 still has the same problems as the one in FIG. 1, where $$I_{av} = TD^2 \frac{V_i}{2L}\left(\frac{V_c}{V_i}\right) \quad (3)$$

One conventional fix to this problem uses a comprehensive controller to manipulate the frequency by the following law:

$$T = T_{on}\left(1 - \frac{V_i}{V_c}\right), \quad (4)$$

However, this approach introduces variable frequency, creating its own set of problems.

In isolated switch mode power converters where transformers are used, some very challenging tasks should be accomplished: transformer reset, handling energy stored in the leakage inductance of the windings, and turning switches on and off with minimum losses ("softswitching"). U.S. Pat. Re. 36,098, titled "Optimal resetting of the transformer's cores in single ended forward converters", gives a technical solution for a transformer reset in the forward type of converters. Application of this technique to the flyback type of converters would be useless by definition of a flyback as a system where energy, stored in the core, is returned to the load ("transformer reset"). U.S. Re. 36,098 also does not address the issue of utilizing energy, stored in the leakage inductance, which is very critical for high efficiency of any type of converter. To achieve that, unlike in the U.S. Re. 36,098, the circuit should resonate with the leakage inductance, which is at least in order of magnitude smaller than magnetizing inductance, making the resonance frequency of the circuit much, much higher than in Re. 36,098 and setting quite different and more challenging requirements for the circuit itself and any associated control circuits.

Another technical task facing designers of the isolated switching converters is feedback structure for automatic output regulation. An optocoupler between primary and secondary circuits is used in most typical solutions. However, even the best optocouplers on the market today bring a lot of limits to the feedback and quite low bandwidth. That's why there is an attempt now to switch voltage sensing of the output from primary side of the transformer, as described in U.S. Pat. Nos. 5,757,625 and 5,438,499.

However, the referenced prior art is using quite complicated analog circuits to derive a signal, representative of output voltage. Actual circuits are performing analog simulation of the converter, based on some sensed signals. The cost of the controllers is high, and the accuracy is questionable.

Accordingly, there exists a need for a switch mode AC/DC converter with input AC current shaped to limit high harmonics content and with voltage across the bulk capacitor well contained. To achieve high efficiency, this converter should utilize stored leakage inductance and provide, if necessary, a soft switching and secondary synchronous rectification. Further, the feedback structure of the isolated AC/DC converter should be simplified by sensing the feedback signal from the primary side of the transformer. The present invention addresses such a need.

SUMMARY OF THE INVENTION

A switch mode AC/DC converter with input current shaped for unity power factor. Input current is modulated by input voltage, and input inductor and isolation transformer are driven with the same duty ratio, with a low voltage across bulk capacitor. This voltage is determined only by input voltage amplitude. Energy stored in the leakage inductance of the transformer is returned back to the internal DC source. A soft switching circuit is connected to the primary side, eliminating the need for high side drive. Sources of the main and auxiliary switches and primary winding of the transformer are connected to ground for easy primary voltage sensing. Overvoltage protection circuit of the output is connected to exclusively primary side signals. Secondary synchronous rectifier is driven by a circuit synchronized with the system clock. The circuit can be coupled to either the primary or the secondary winding of the isolation transformer.

DESCRIPTION

Figure 1:
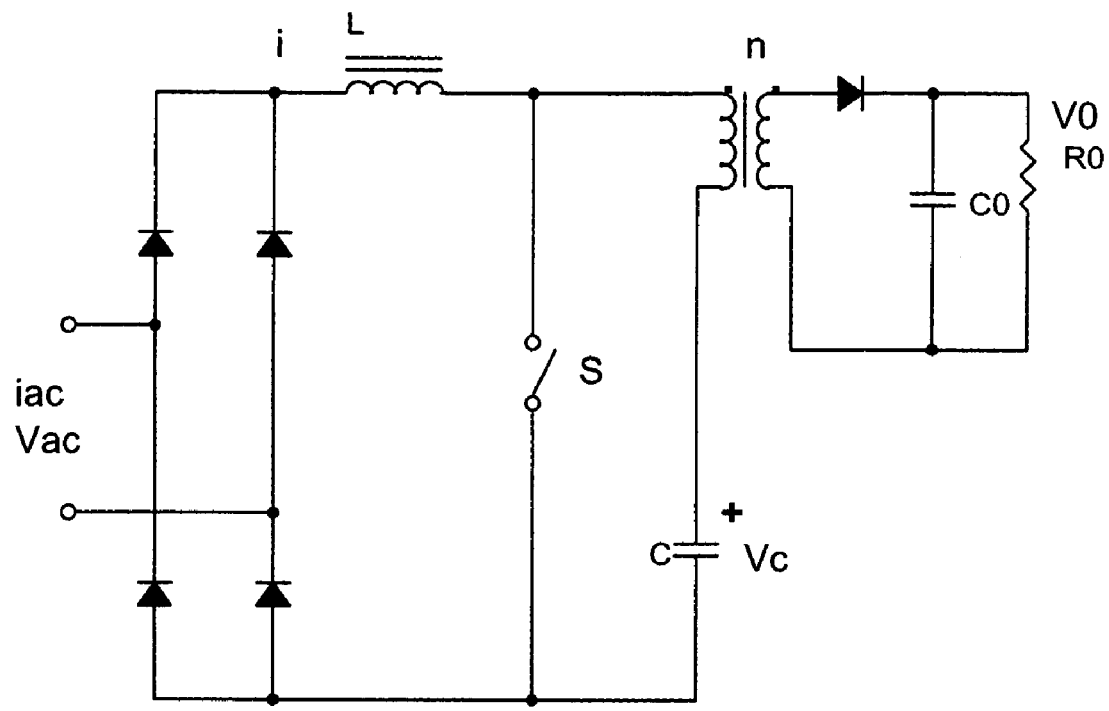
FIG. 1 illustrates a prior art AC/DC converter with power factor correction.
Figure 2:
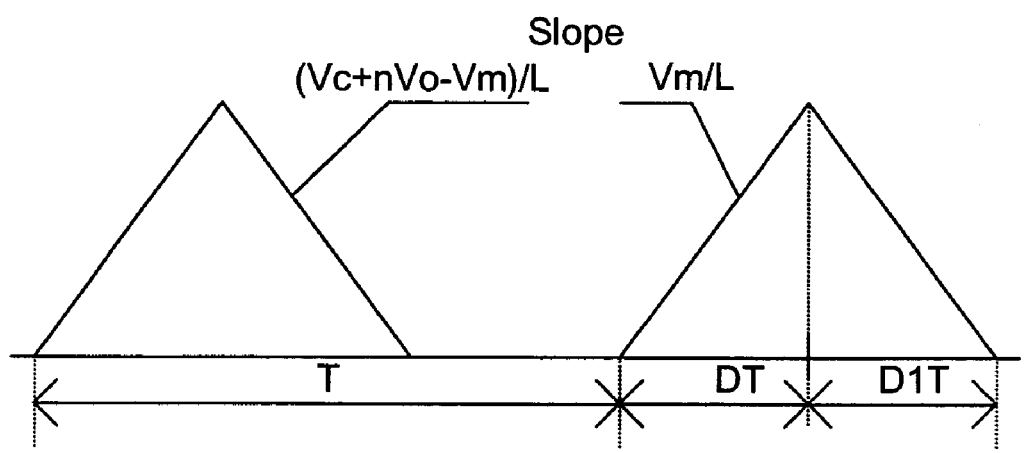
FIG. 2 illustrates current waveforms of the prior art AC/DC converter in FIG. 1.
Figure 3:
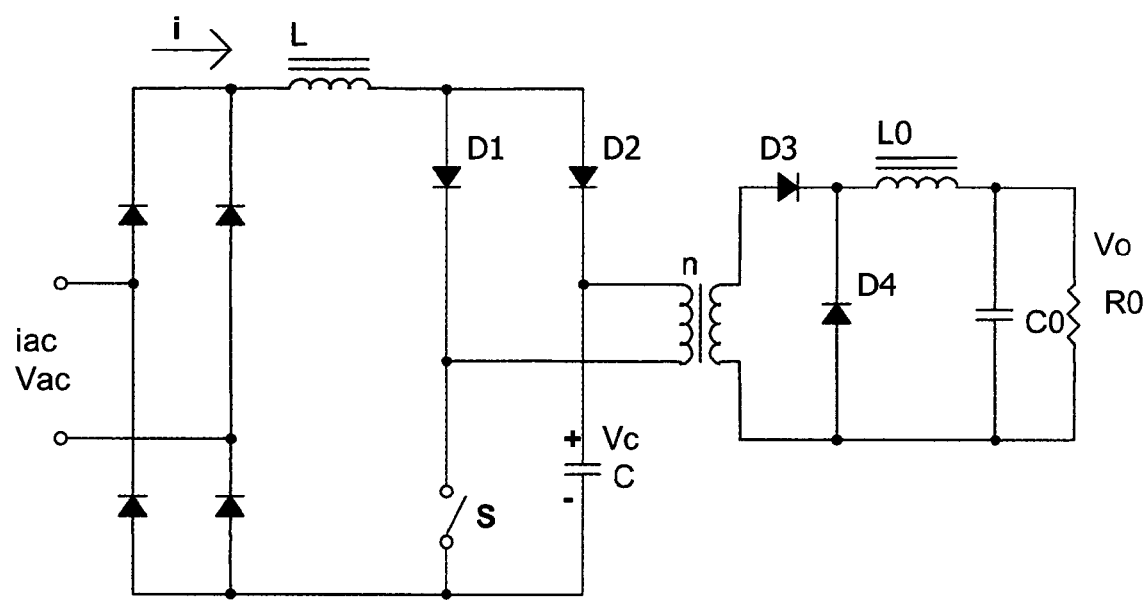
FIG. 3 illustrates a prior art AC/DC converter with power factor correction and improved voltage on the bulk capacitor.
Figure 4:
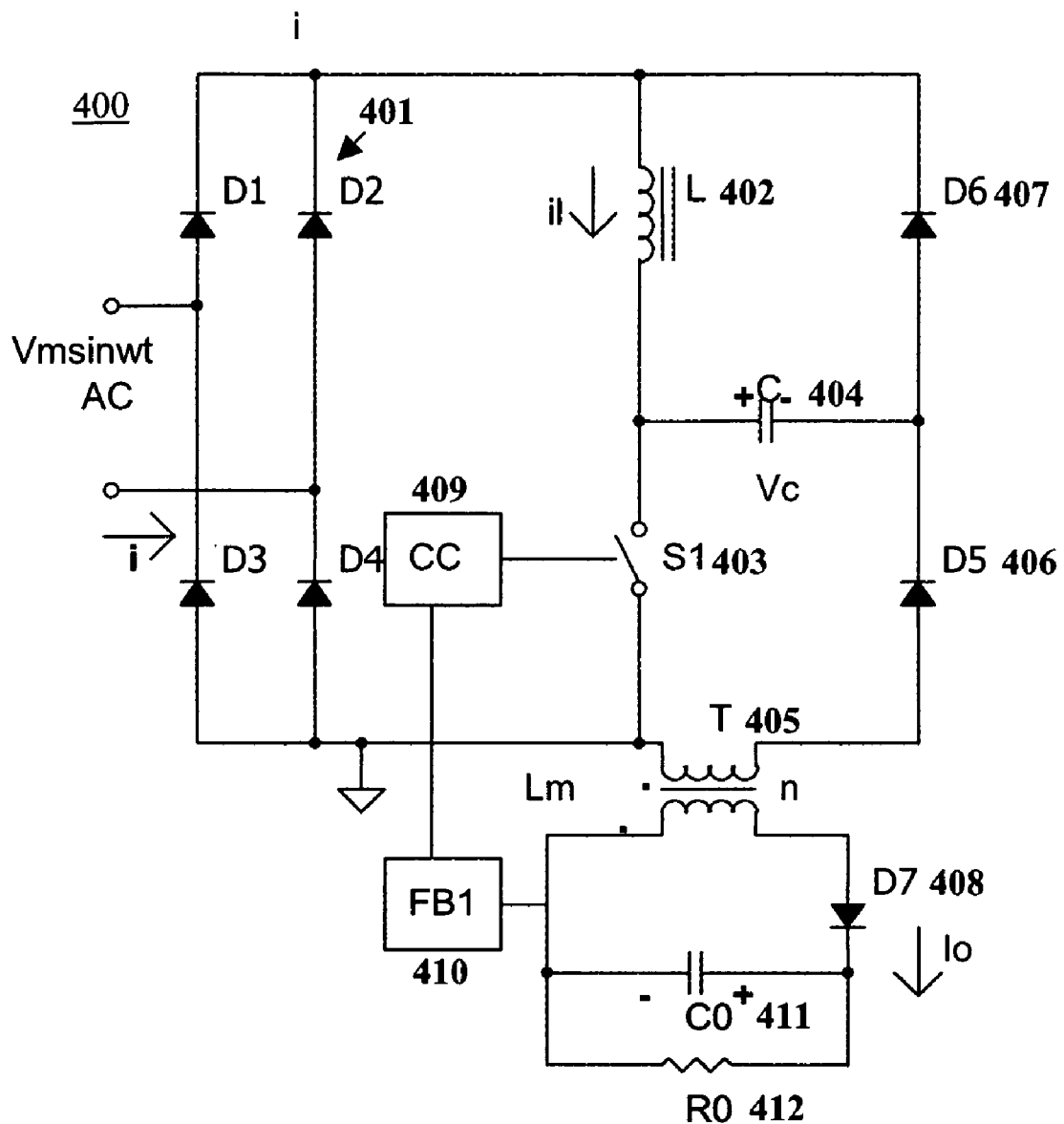
FIG. 4 illustrates an embodiment of an AC/DC converter in accordance with the present invention.

FIG. 4 illustrates an embodiment of an AC/DC converter 400 in accordance with the present invention. The AC/DC rectifier D1–D4 (401) of the converter 400 is connected with its positive terminal to the first terminal of the input inductor L (402), and with negative terminal to a ground node. The first terminal of the switch S1 (403) is connected to the second terminal of the input inductor L (402) and positive terminal of the bulk capacitor C (404). The second terminal of switch S1 (403) is connected to the first terminal of the isolation transformer T (405) and the ground node. The second terminal of transformer T (405) is coupled with the negative terminal of the bulk capacitor C (404) via an isolating diode D5 (406), connected with its anode to the transformer T (405) and cathode to the bulk capacitor C (404). The negative terminal of the bulk capacitor C (404) is connected to the first terminal of the inductor L (402) via an isolating diode D6 (407), connected with its anode to the capacitor C (404) and cathode to inductor L (402). The secondary winding of the transformer T (405) is coupled to the load (412) via blocking diode D7 (408). The control system CC1 (409) is connected to the control terminal of the switch S1 (403) and includes the output voltage feedback loop FB1 (410). The equivalent diagrams of the converter 400 are presented in FIGS. 5a–5c, and its waveforms in FIG. 6.

Figure 5:
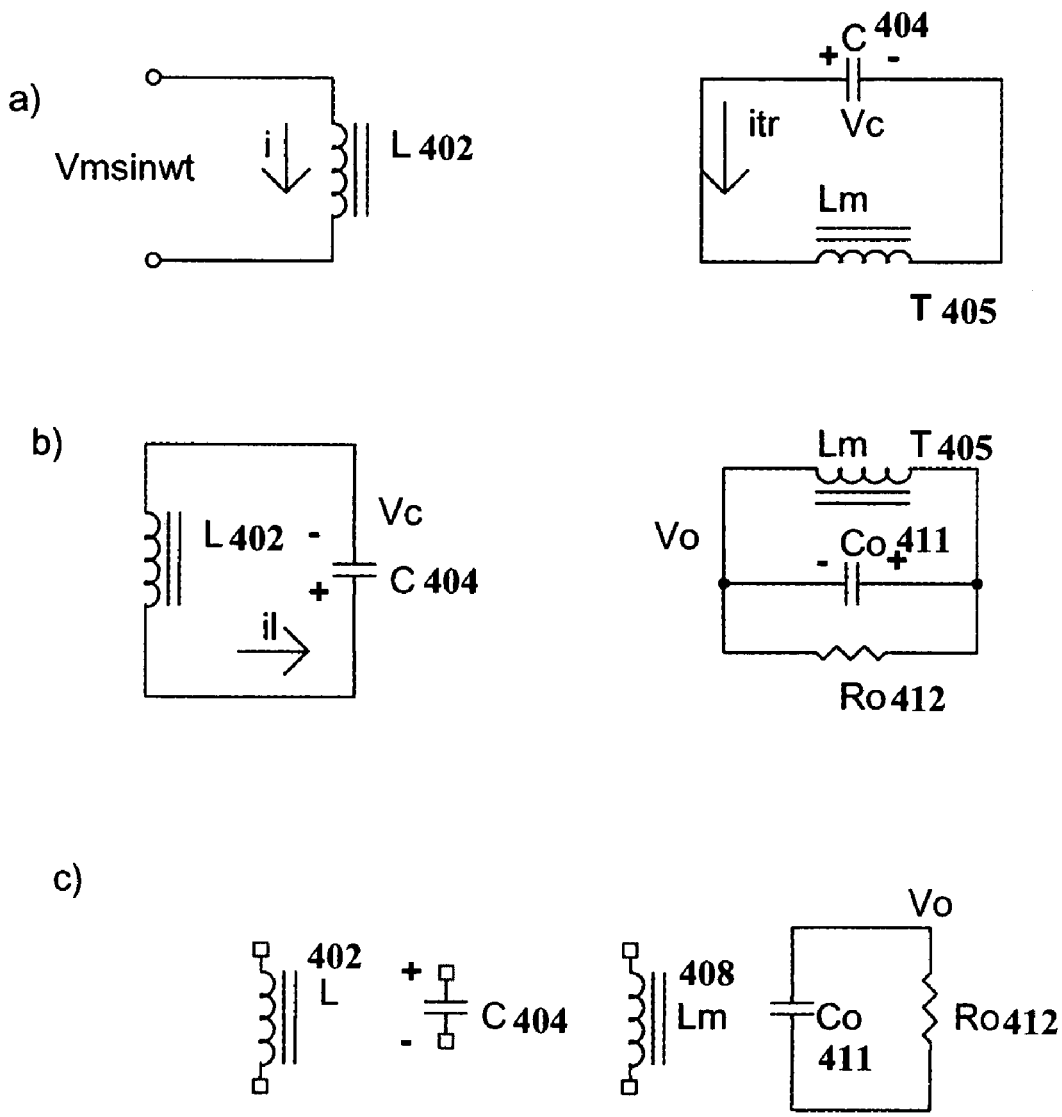
FIGS. 5a–5c illustrate equivalent schematics of the converter in FIG. 4.

FIG. 5a illustrates interval t0-t1, where the input inductor L (402) stores energy from the input and magnetizes inductance of the transformer T (405) from bulk capacitor C (404).

FIG. 5b illustrates interval $t_1$–$t_2$, where the input inductor L (402) is discharging its energy into the bulk capacitor C (404), and transformer T (405) is transferring its stored energy to the output.

FIG. 5c illustrates interval $t_2$–$t_3$, where all storage elements are empty, except for the output filter capacitor $C_o$ (411) which supports the load current.

FIG. 6a illustrates waveforms for an input AC current.

FIG. 6b illustrates waveforms for an input inductor.

FIG. 6c illustrates waveforms for a primary transformer.

FIG. 6d illustrates waveforms for a secondary transformer.

For the converter 400 in FIG. 4, the following relationship are valid, assuming that within the input frequency cycle, the duty ratio D=const:

Input current i $$L \frac{di}{dt} = V_i \quad (5)$$

$$di = \frac{V_i}{L} dt \quad (7)$$

$$i = \frac{V_i DT}{L} = \frac{DT}{L} V_m \sin\omega t = I_m \sin\omega t \quad (8)$$

where $V_m$ is the amplitude of the input voltage, and $I_m$ is the amplitude of the average input current.

Figure 6:
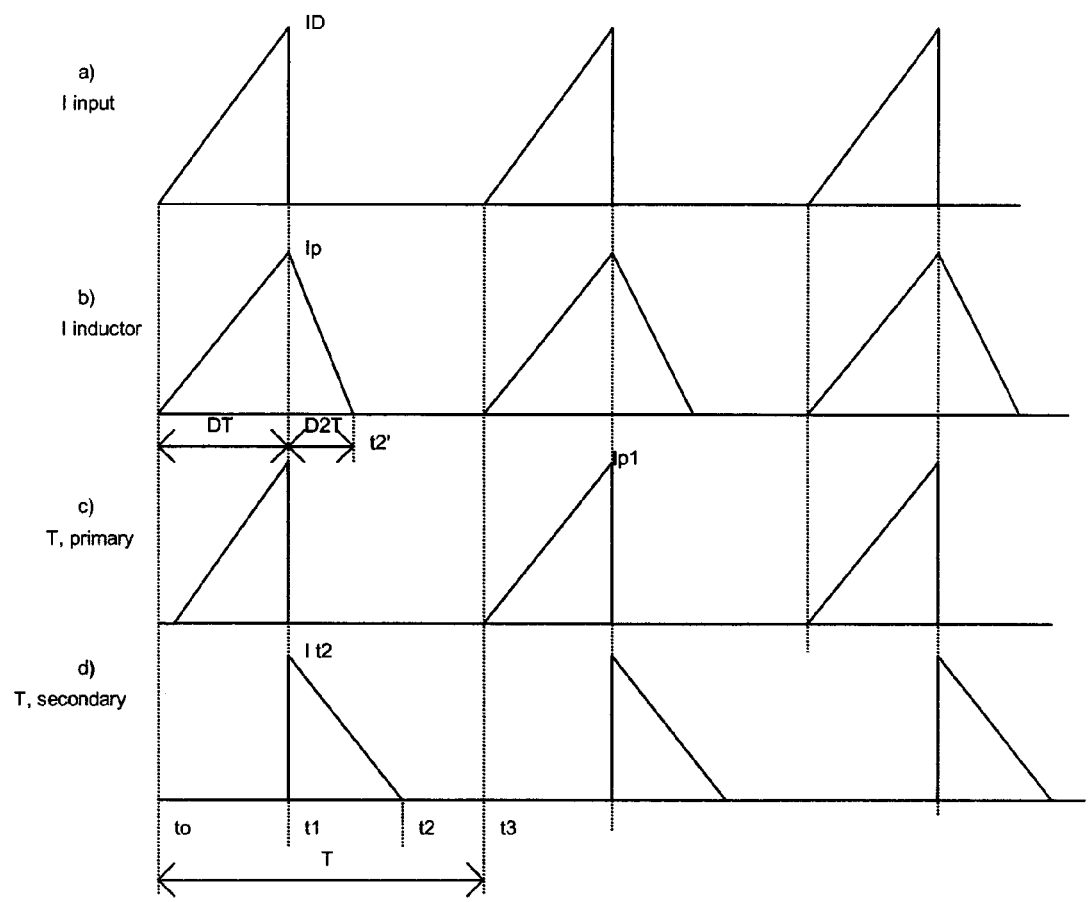
FIGS. 6a–6d illustrates current waveforms of the AC/DC converter in FIG. 4.

Equation (8) is an analytical expression of the shaped primary current, and theoretically it does not have any higher than main harmonics (See FIG. 6).

The input current amplitude:

$$I_m = \frac{DT}{L} V_m \quad (9)$$

For further analysis, assume a discontinuous mode of operation for both input inductor L (402) and transformer T (405).

As illustrated in FIG. 6, peak inductor current at positive slope:

$$ip = \frac{TD}{L} V_m \sin\omega t \quad (10)$$

The same current at negative slope:

$$ip = \frac{V_c}{L} D_2 T \quad (11)$$

where $D_2$ is the duty cycle of the negative slope in the inductor.

Equalizing equations (10) and (11), the expression for $D_2$:

$$D_2 = D \left(\frac{V_m}{V_c}\right) \sin\omega t \quad (12)$$

Or $D_2$ is modulated by $\sin \omega t$, and the average value of $D_2$:

$$D_{2av} = \left(\frac{1}{\pi}\right) \int_0^\pi \left(\frac{DV_m}{V_c}\right) \sin\omega t \, d(\omega t) = \frac{2DV_m}{\pi V_c} \quad (13)$$

Voltsecond balance of the transformer:

$$\frac{V_c D}{n} = V_0 D_1 \quad (14)$$

where $D_1$ is the duty ratio of the flyback transformer reset.

Transfer coefficients:

$$\frac{V_c}{V_o} = n \frac{D_1}{D} \quad (15)$$

$$\frac{V_m}{V_c} = \left(\frac{\pi}{2}\right)\left(\frac{D_{2av}}{D}\right) \quad (16)$$

Peak energy in the input inductor:

$$W_i = L\left(\frac{ip^2}{2}\right) = \frac{L}{2}\left(\frac{DT}{L} V_m \sin\omega t\right)^2 = \left(\frac{D^2 T^2 V_m^2}{2L}\right) \sin^2\omega t \quad (17)$$

Average energy in one half of the cycle:

$$W_{av} = \left(\frac{1}{\pi}\right)\left(\frac{D^2 T^2 V_m^2}{2L}\right) \int_0^\pi (\sin^2\omega t) \, d(\omega t) = \frac{D^2 T^2 V_m^2}{4L} \quad (18)$$

And input power:

$$P_{in} = \frac{D^2 T V_m^2}{4L} \quad (19)$$

Peak primary current in the transformer:

$$I_p = \frac{V_c DT}{L_m} \quad (20)$$

Transformer power (assuming 100% efficiency):

$$P_{tr} = \frac{L_m I_p^2}{2T} = \frac{D^2 T V_c^2}{2L_m} \quad (21)$$

As $P_{in} = P_{tr}$, $$\frac{D^2 T V_m^2}{4L} = \frac{D^2 T V_c^2}{2L_m} \quad (22)$$

Or $$V_c = V_m \sqrt{\frac{L_m}{2L}} \quad (23)$$

Output power:

$$P_{out} = I_o V_o \quad (24)$$

$$\frac{D^2 T V_m^2}{4L} = I_o V_o \quad (25)$$

Duty cycle:

$$D = \frac{1}{V_m}\sqrt{4fLI_o V_o} \quad (26)$$

where f=1/T–frequency of the converter

From equation (25), $$L = \frac{D^2 V_m^2}{4I_o V_o} \quad (27)$$

The value of the inductance shall be found at $V_m = V_{min}$ and $I_o = I_{omax}$. Assuming D=0.5, $$L = \frac{V_{min}^2}{16fP_{max}} \quad (28)$$

It follows from equations (21) and (24) that $$L_m = \frac{V_{cmin}^2}{8fP_{max}} \quad (29)$$

It is recommended to select $$V_{cmin} = \frac{V_{min}}{\sqrt{2}} \quad (30)$$

Then $$L = L_m \text{ and } n = \frac{V_{min}}{V_o\sqrt{2}} \quad (31)$$

A similar analysis may be done for the converter 400 in FIG. 4, working in the continuous mode of operation.

From equation (8) average AC input current:

$$I_{av} = \left(\frac{V_m T D^2}{2L}\right)\sin\omega t \quad (32)$$

And input power:

$$P_{ac} = \frac{1}{\pi}\int_0^\pi V_m\left(\frac{V_m T D^2}{2L}\right)\sin\omega t\, d(\omega t) = \frac{V_m^2 T D^2}{4L} \quad (33)$$

RMS value of AC input current:

$$I_{rms} = \sqrt{\frac{1}{\pi}\int_0^\pi \left(\frac{V_m D^2 T}{2L}\right)2\sin^2\omega t\, d(\omega t)} = \frac{V_m D^2 T}{2L} \quad (34)$$

Power factor:

$$P_f = \frac{V_{rms}}{P_{ac}} = \frac{\left(\frac{V_m}{2}\right)\left(\frac{V_m D^2 T}{2L}\right)}{\left(\frac{V_m^2 T D^2}{4L}\right)} = 1 \quad (35)$$

Total harmonic distortion, THD:

$$THD = \sqrt{\left(\frac{\cos^2\Psi}{P_f^2}\right) - 1} \quad (36)$$

Due to used technique of input current modulation:

$$\Psi = 0 \quad (37)$$

and Pf=1 from 35, so $$THD = 0, \quad (38)$$

or the input current is ideally shaped to have a sinusoidal waveform without any content of harmonics higher than the first.

Power factor Pf in the converter 400 at any operating condition is equal to unity. This provides a major advantage over the prior art, where Pf is approaching unity only at some special operating conditions, mostly at unacceptably high voltage at the bulk capacitor C.

Figure 7:
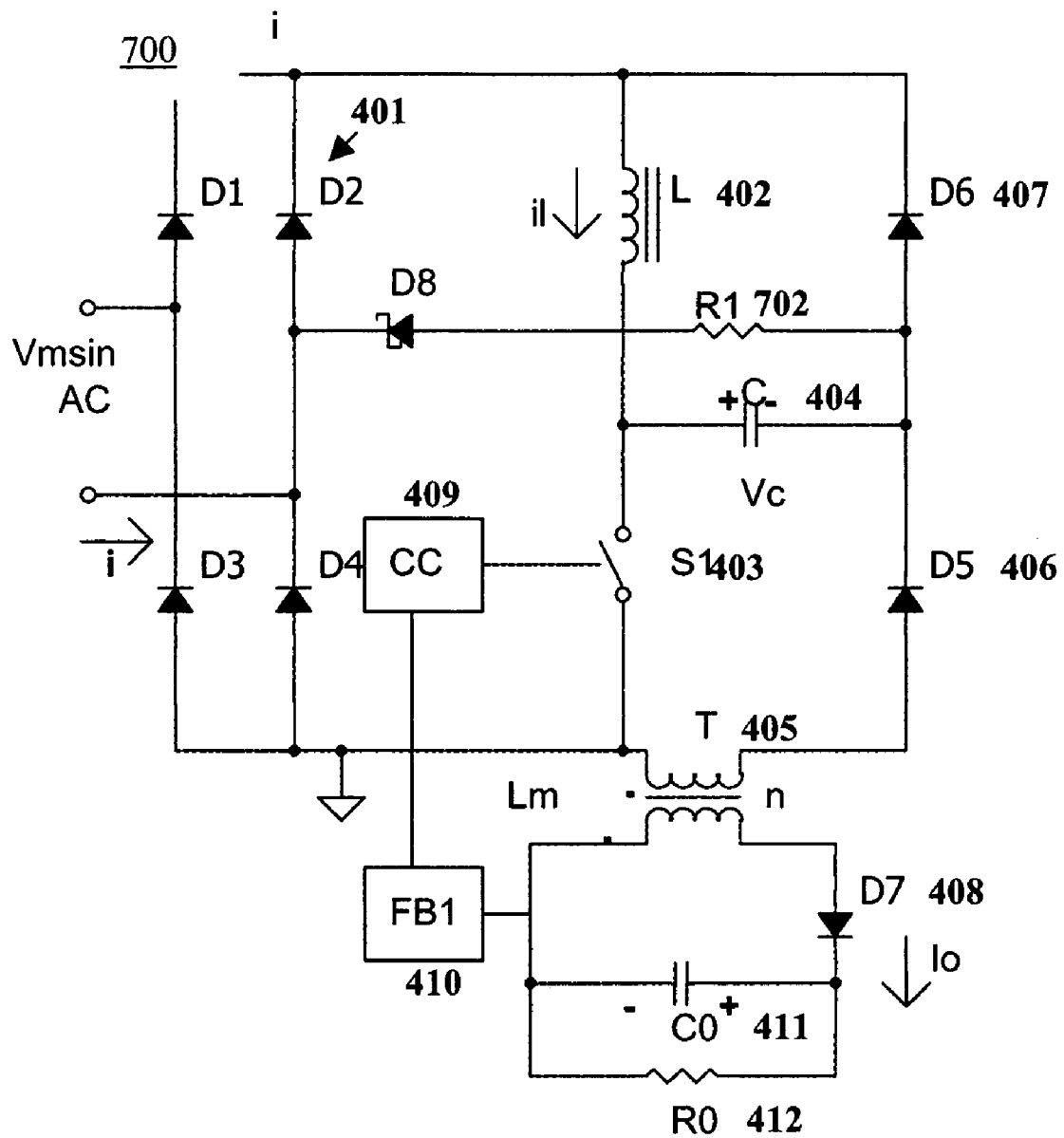
FIG. 7 illustrates an embodiment of an AC/DC converter with a start up circuit in accordance with the present invention.

FIG. 7 illustrates another embodiment of the converter in accordance with the present invention. The converter 700 has a diode D8 (701) connected with its cathode to one of the AC terminals and with its anode to the resistor R1 (702) coupled to the negative terminal of the bulk capacitor C (404). This will provide an initial charge to the bulk capacitor C (404) to improve conditions of the circuit start up.

Figure 8:
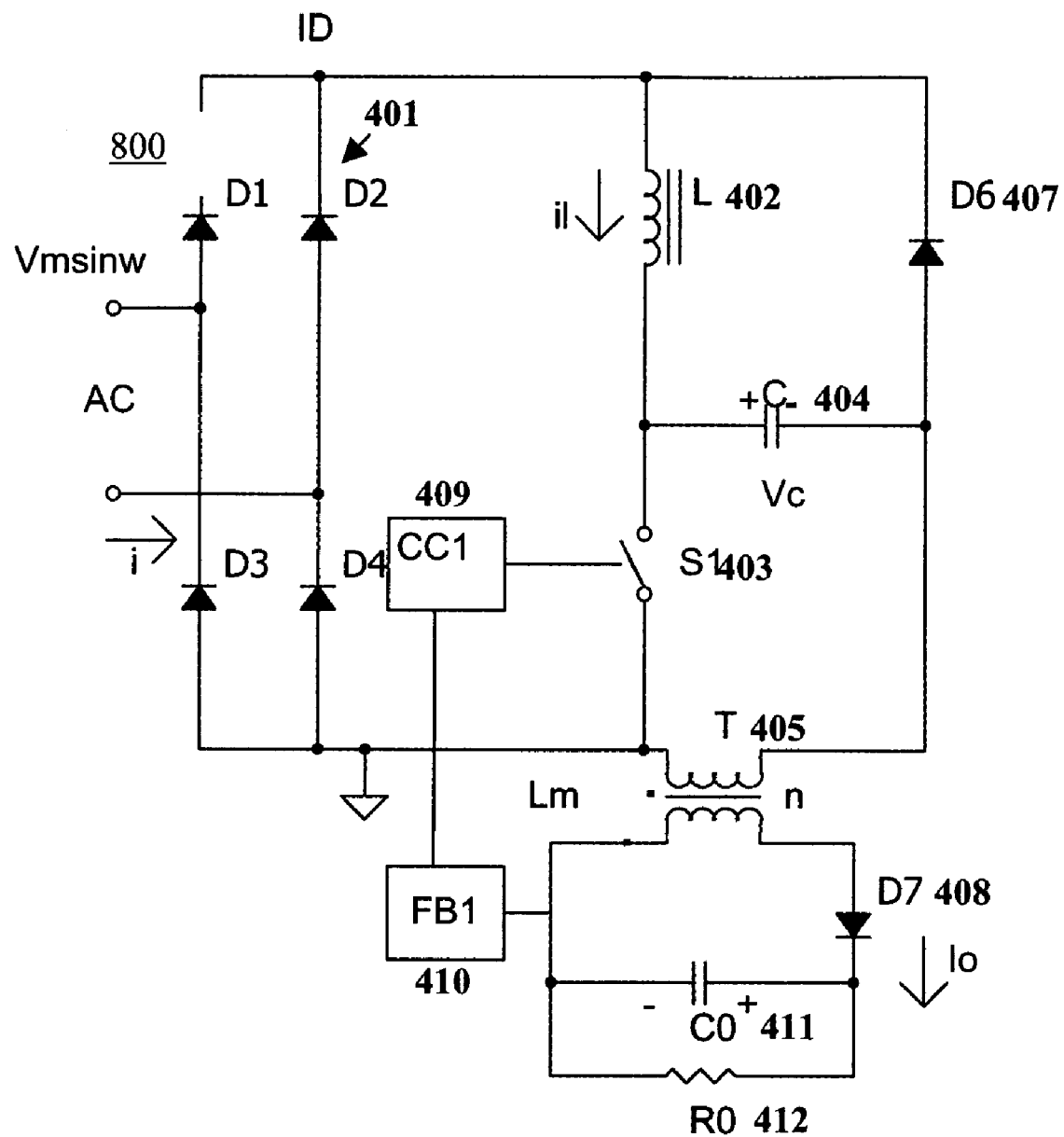
FIG. 8 illustrates an embodiment of an AC/DC converter without an isolating diode in accordance with the present invention.

The transformer T (405) in the converter 800 illustrated in FIG. 8 is connected between a ground node and a negative terminal of the bulk capacitor C (404). Compared to the converter 400 in FIG. 4, the isolation diode D5 (406) is dropped to improve efficiency. This converter configuration is valid when the design is done in a such manner that:
a) $V_c > V_m$ at any conditions, or
b) the transformer T (405) operates in the continuous mode and $2V_c > V_m$ at any conditions.

Figure 9:
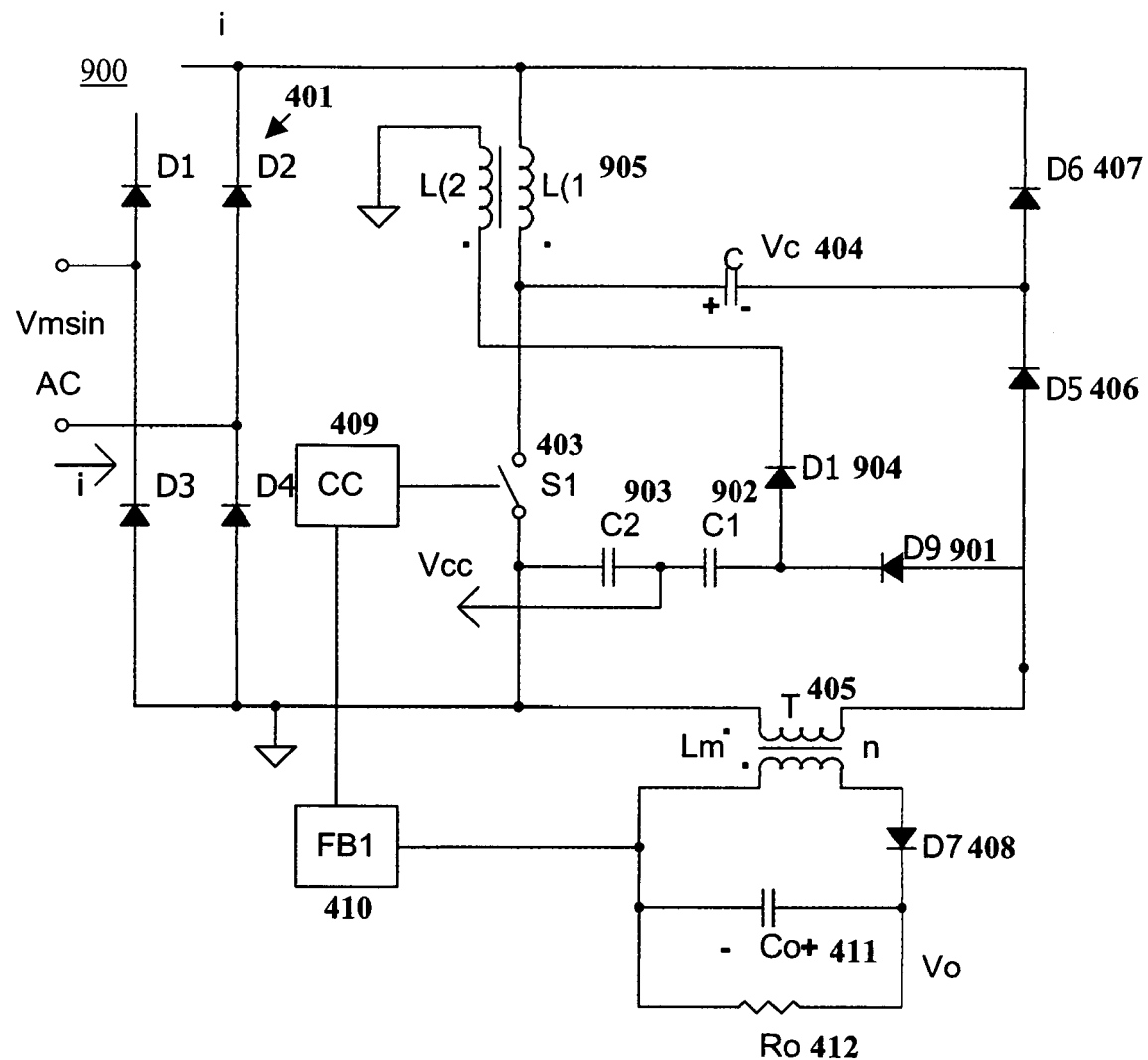
FIG. 9 illustrates an embodiment of an AC/DC converter with a lossless snubber in accordance with the present invention.

To improve further the efficiency, a leakage energy recovery circuit added to the converter 900 illustrated in FIG. 9. A diode D9 (901) and capacitors C1 (902) and C2 (903) are connected across the primary winding of the transformer T (405). When switch S1 (403) is off, the energy stored in the leakage inductance of T (405) will be transferred to capacitors C1 (902) and C2 (903) through a resonance process. Voltage across C2 (903) is used for driving a controller. When voltage across capacitors C1 and C2 is equal to $V_c$, the energy stored in capacitors C1 (902) and C2 (903) will be transferred to inductor L (402), when it is in the reset mode. For this purpose, inductor L (905) is equipped with an overwinding L(2) with the same number of turns as the main winding L(1), but for much lower current. The overwinding L(2) is connected between the ground node and the cathode of isolation diode D10 (904), which anode is coupled to the cathode of diode D9 (901).

Figure 10:
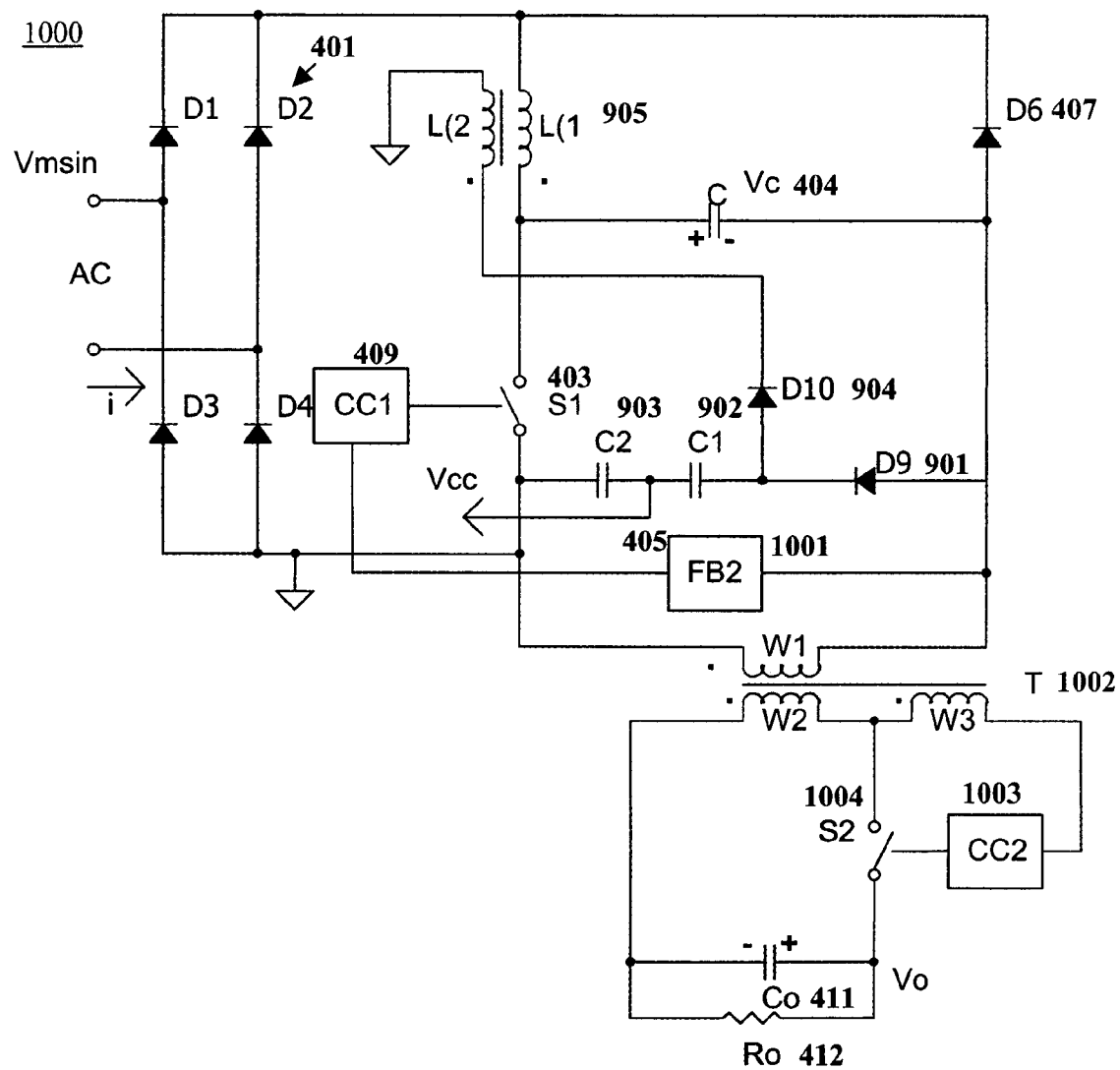
FIG. 10 illustrates an AC/DC converter with the primary side feedback in accordance with the present invention.

Another aspect of the invention is to provide a high efficiency converter 1000 illustrated in FIG. 10 by utilizing secondary synchronous rectification and providing primary sensing for a closed feedback loop (1001). A synchronous rectifier element S2 (1004) is connected between the secondary winding W2 of the transformer T (1002) and positive terminal of the output. Its control terminal is connected to a secondary control circuit CC2 (1003), coupled to the second secondary winding W3 of the transformer T (1002).

Figure 11:
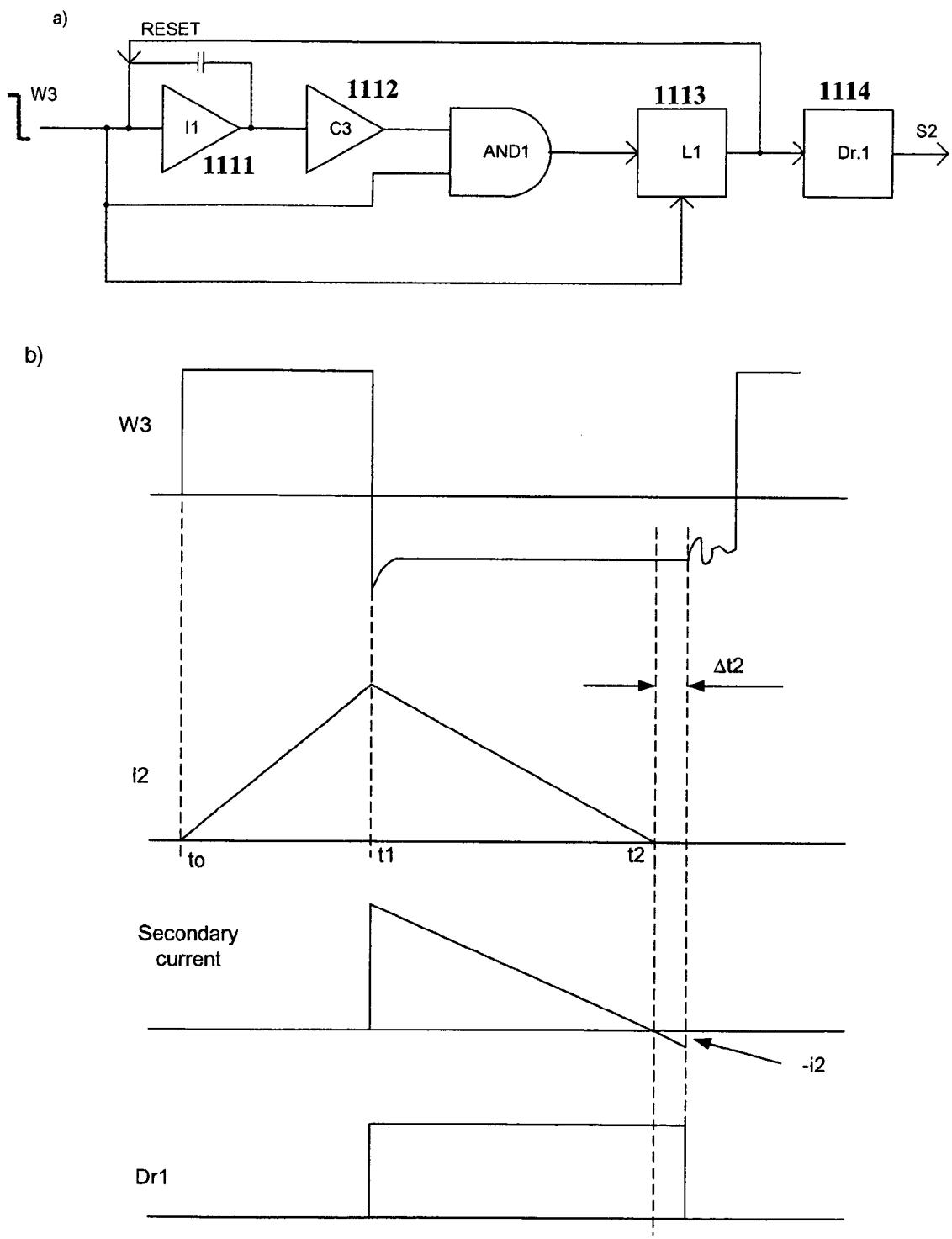
FIGS. 11a–11b illustrate a secondary control circuit of the converter in FIG. 10.

When a voltage across a second secondary winding W3 of transformer T (1002) is becoming negative at the dot, the secondary control circuit CC2 (1003) turns on the switch S2 (1004). Further performance of the converter 1000 is illustrated in FIG. 11. When voltage at the dot of winding W3 goes positive, it starts to charge the integrator I1 (1111). At the negative swing of the winding W3, sensed by logic L1 (1113), the integrator I1 (1111) fixes voltseconds, applied to the transformer T (1002). Logic L1 (1113) now resets the integrator I1 (1111) with the negative voltage applied to it from the winding W3. When the integrator I1(1111) reaches 0 volts, the positive and negative voltseconds of the transformer T (1002) are balanced, and the transformer T (1002) has completed its reset. For the secondary control circuit CC2 (1003), it's a signal to turn S2 (1004) off. A comparator C3 (1112) senses the 0 volt output of the integrator I1 (1111) and activates logic L1 (1113). Logic L1 (1113) has a certain delay before it sets the driver (1114) in condition to turn off the switch S2 (1004). That overdrives the switch S2 (1004), allowing some negative current through it for time Δt2. The overdrive of the switch S2 (1004) is needed for primary feedback sensing. In terms of power processing, this overdrive does not compromise the efficiency of the converter 1000 as the energy will be returned to the bulk capacitor C (404) by the primary side of the transformer T (1002). Moreover, with more complicated power stage designs, this feature may be used for a primary S1 (403) switch softswitching, enabled by the secondary switch S2 (1004).

Figure 12:
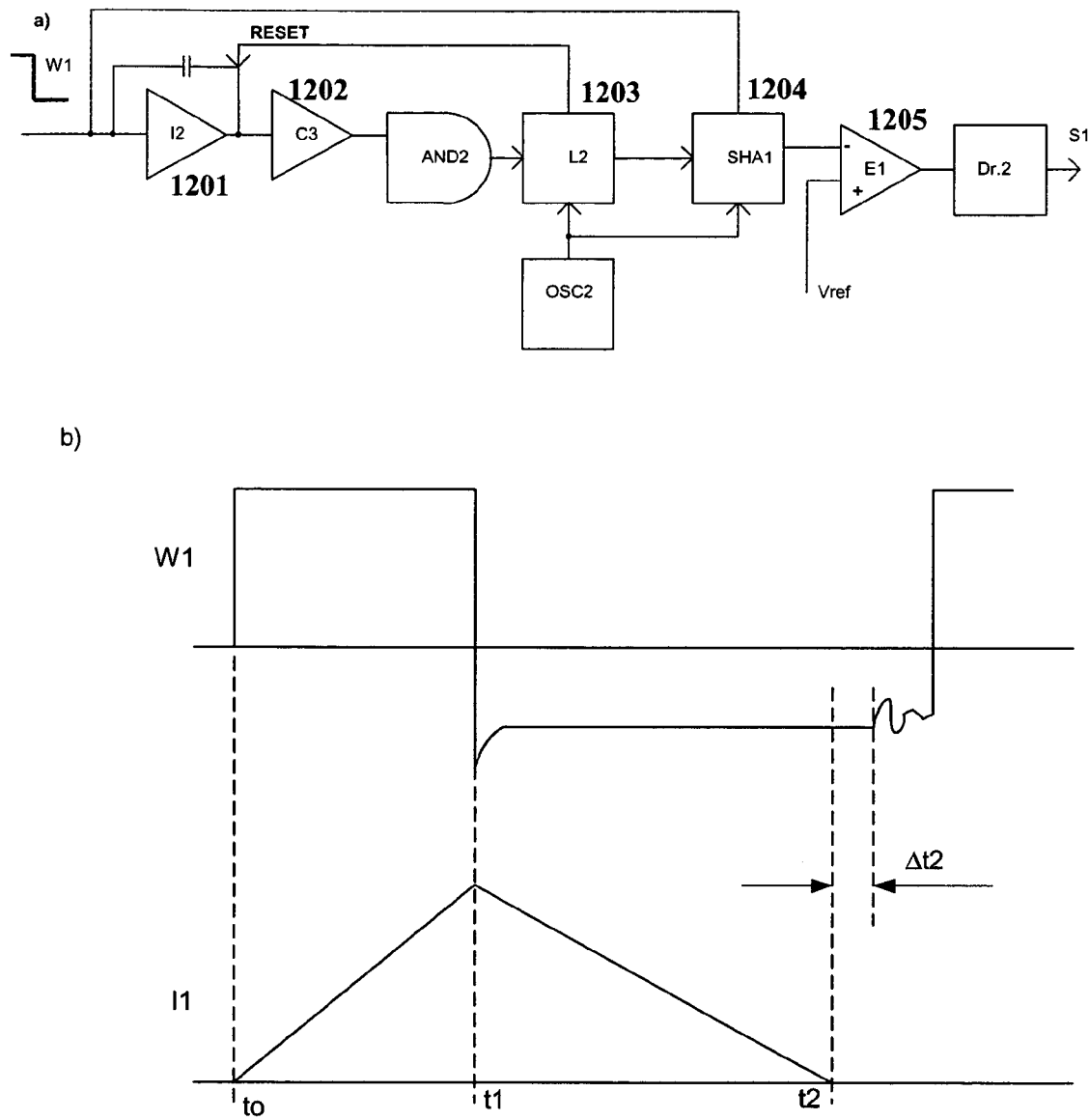
FIGS. 12a–12b illustrate a primary control circuit of the converter in FIG. 10.
Figure 13:
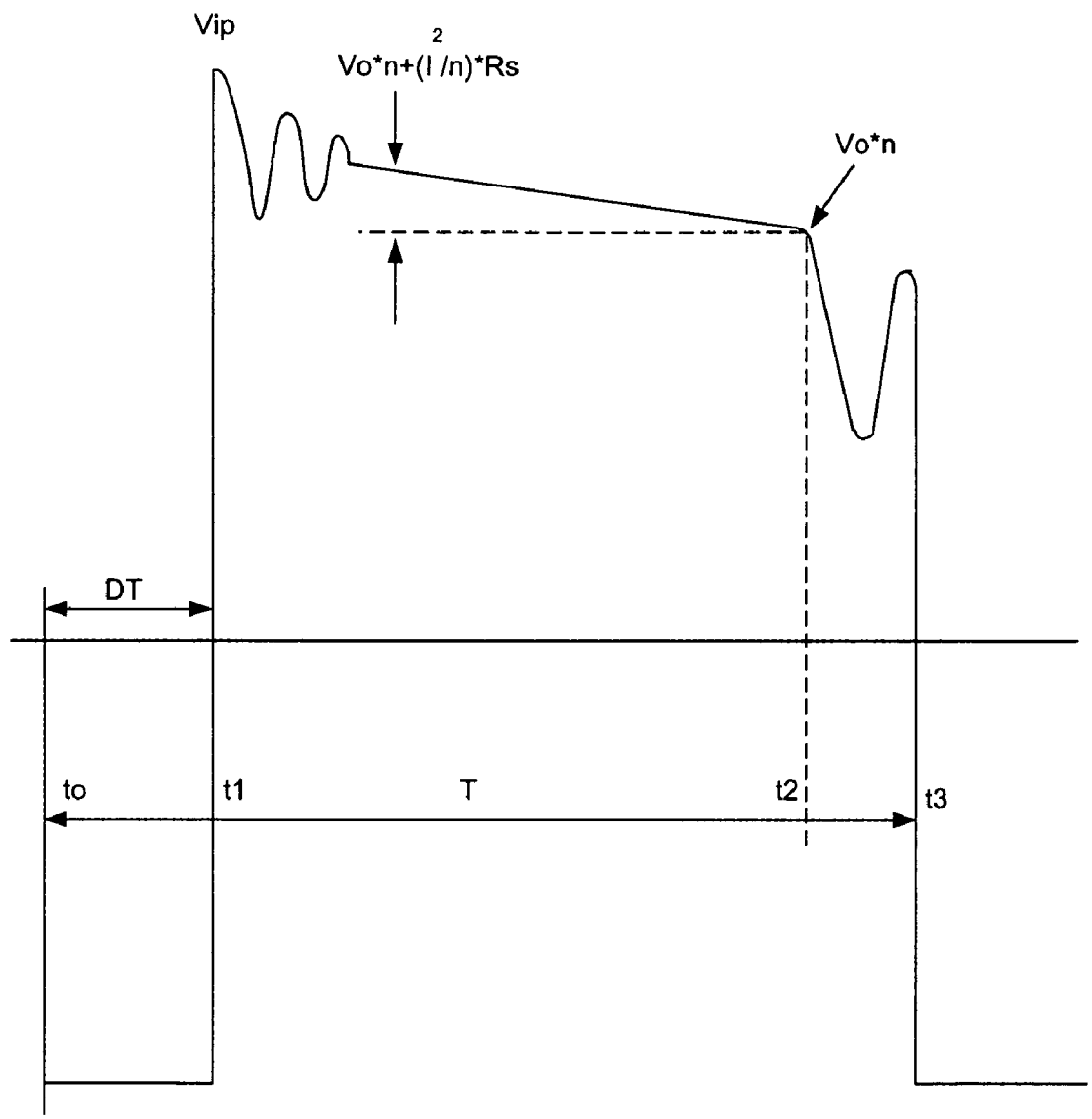
FIG. 13 illustrates a prior art voltage across a flyback transformer.
Figure 14:
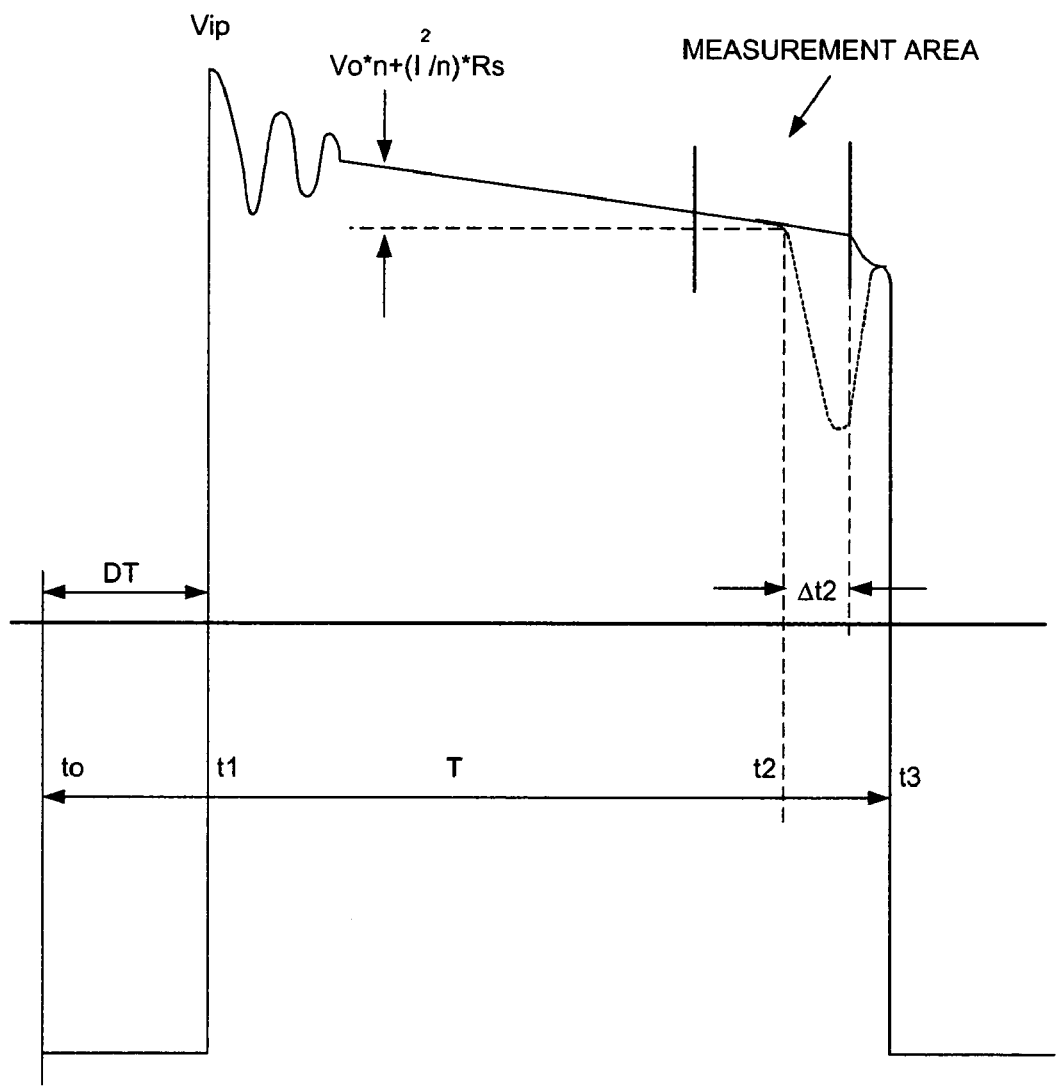
FIG. 14 illustrates a voltage across a flyback transformer of the converter in FIG. 10.

The sensing of the feedback signal on the primary side of the transformer T (1002) is illustrated by FIG. 12. Integrator I2 (1201) of the control Circuit CC1 (409) is connected to the primary winding W1 of the transformer T (1002) via a resistive divider (not shown). Integrator I2 (1201), logic L2 (1203), comparator C3 (1202), and winding W1 are performing the same voltseconds balancing identification as it was described in the secondary control circuit CC2 (1003). When the comparator C3 (1202) triggers logic L2 (1203), it is the best time to sense the output voltage as current in the secondary winding W2, it is very close to 0 volts, and internal voltage drops are eliminated. Overdrive of the switch S2 (1004) is intended to make the sense window wide enough not to require too high an accuracy from controllers CC1 (409) and CC2 (1004). Logic L2 (1203) activates sample and hold circuit SHA1 (1204) which samples the reflected to primary side output voltage, and applies it to the input of the error amplifier E1 (1205). In contrast, a graph of the reflected primary secondary voltage is presented in FIG. 13 for a prior art flyback transformer. FIG. 14 illustrates a graph of the primary secondary voltage for the converter 1000. In FIG. 13, there is only one instant when reflected voltage is equal to the output voltage. However accurate identification of this instant is practically impossible. An attempt to implement it may lead to a delayed measurement when voltage across the transformer collapsed, leading to gross error of the feedback representation of the output voltage. In FIG. 14, however, due to overdrive of the switch S2 (1004), the collapse of the voltage across the transformer T (1002) is delayed, giving to the controller CC1 (409) comfortable time to sample the reflected signal on winding W1 of the transformer T (1002).

Figure 15:
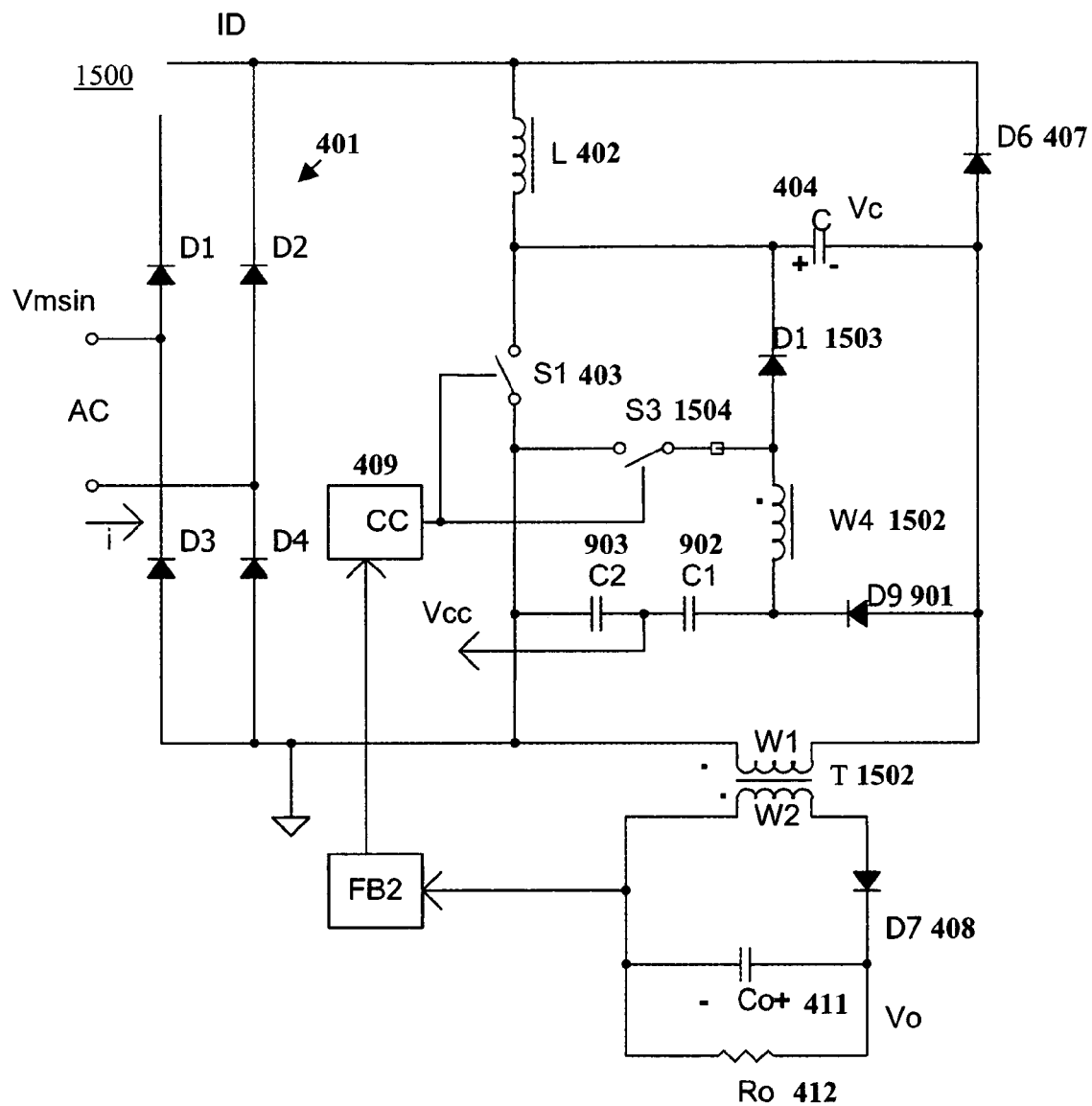
FIG. 15 illustrates an embodiment of an AC/DC converter with softswitching in accordance with the present invention.

Another embodiment of a converter 1500 in accordance with the present invention is illustrated in FIG. 15. A winding W4 (1502) is connected to the positive terminal of the bulk capacitor C (404) via an isolating diode D11 (1503). The second terminal of this winding W4 is connected to the cathode of diode D9 (901). An auxiliary switch S3 (1504) is connected between the ground node and the anode of diode D11 (1503). When switch S1 (403) turns off, energy stored in the leakage inductance of the primary winding W1 of the transformer T (1501) is transferred via diode D9 (901) into capacitors C1 (902) and C2 (903), and leakage inductance of the winding W1 resonates with capacitors C1 (902) and C2 (903). If further energy, stored in the core, is required to be recycled, the magnetizing inductance of the transformer T (1501) resonates with capacitors C1 (902) and C2 (903) through the winding W4 (1502) and switch S3 (1504). The switch S3 (1504) is bi-directional, allowing reverse flow of energy from capacitors C1 (902) and C2 (903) into the transformer core. At this time, switch S3 (1504) is opened, enabling a softswitching turn on of the switch S1 (403). Leakage energy of the winding W4 (1502) is returned back to the bulk capacitor C (404) via diodes D11 (1503) and D9 (901).

Figure 16:
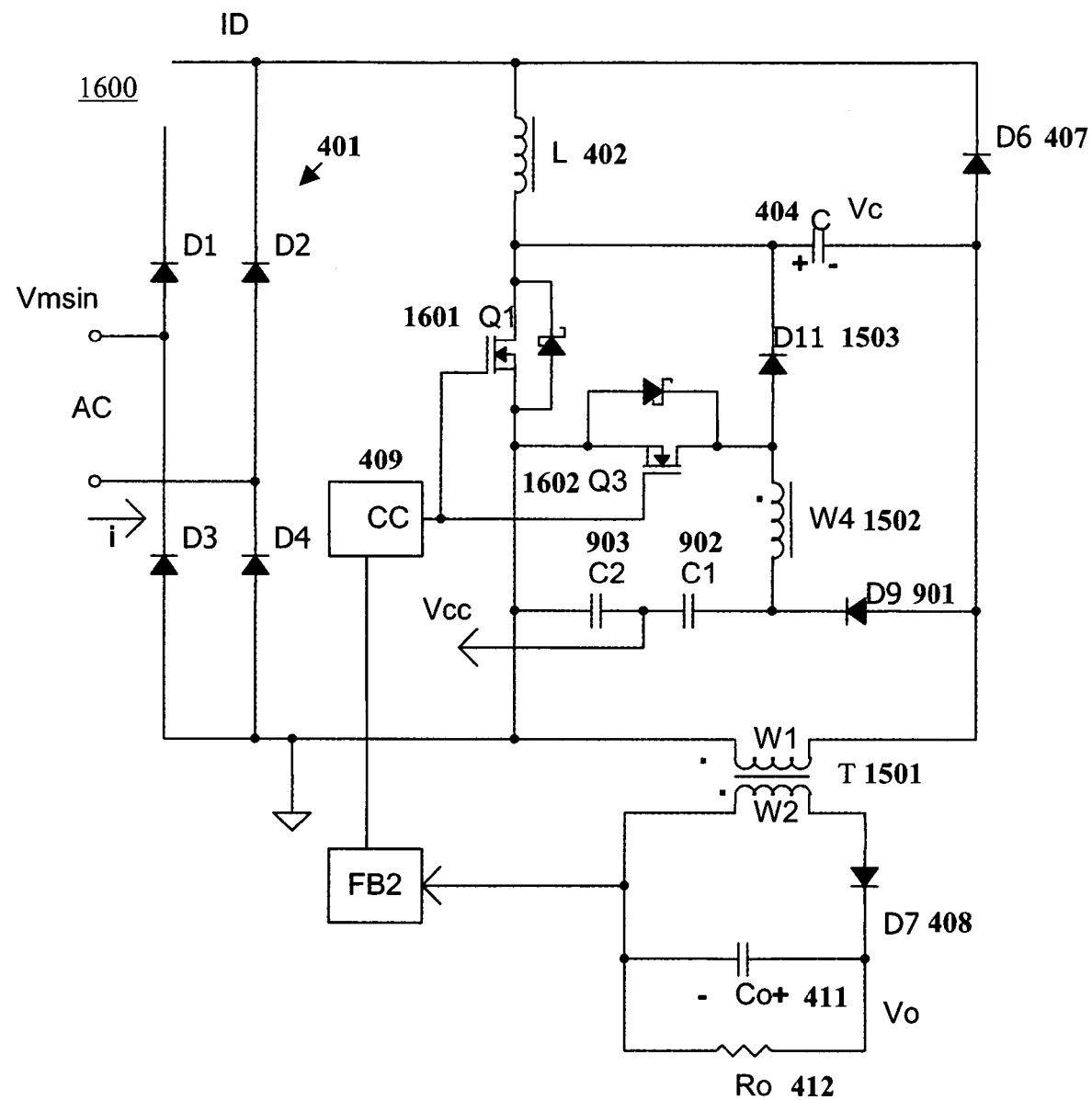
FIG. 16 illustrates an embodiment of the AC/DC converter with softswitching with MOSFET switches in accordance with the present invention.
Figure 17:
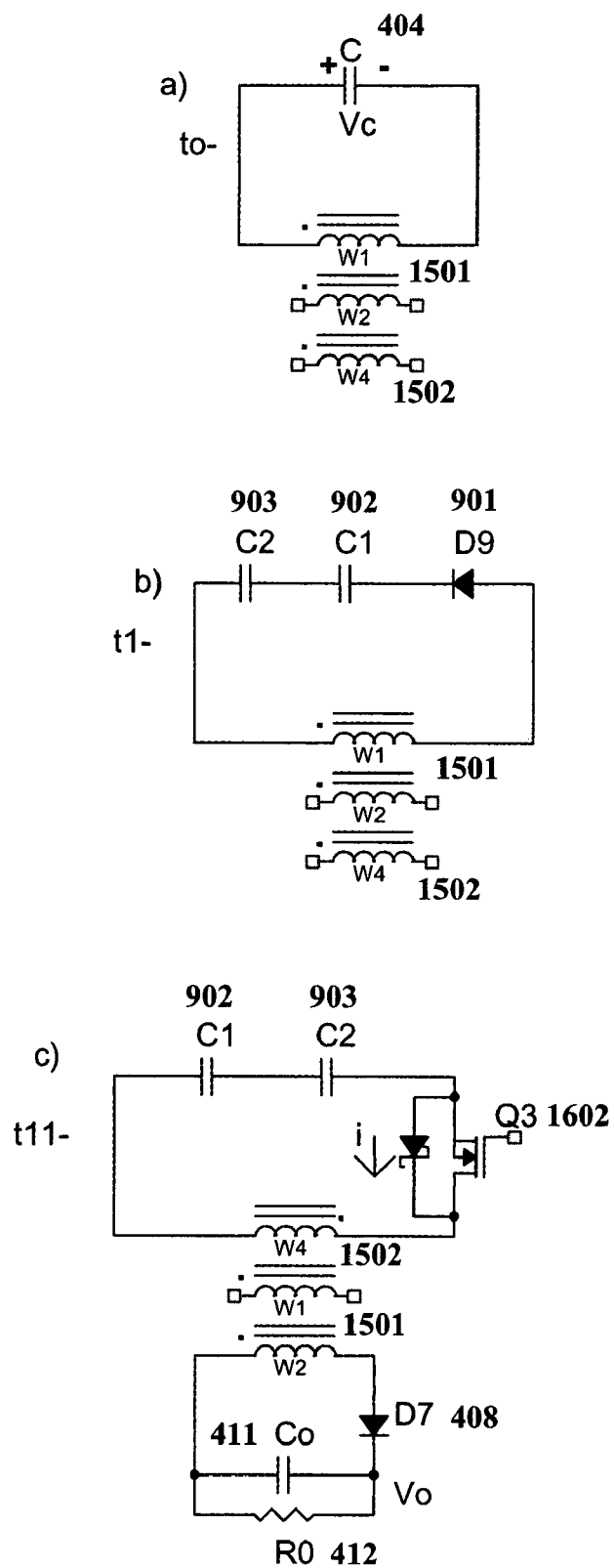
FIGS. 17a–17e illustrate equivalent diagrams of the converter in FIG. 16.

A converter 1600 implemented with N type MOSFET switches Q1 and Q3 is presented in FIG. 16. As illustrated, both switches Q1 (1601) and Q3 (1602) are connected with their sources to the ground node. This is a substantial advantage over the prior art when the auxiliary switch is located at high side, or a P channel MOSFET is used. In both cases of the prior art, a complicated driver of the auxiliary switch is required. In the converter 1600, driving both MOSFETs is quite simple.

Figure 18:
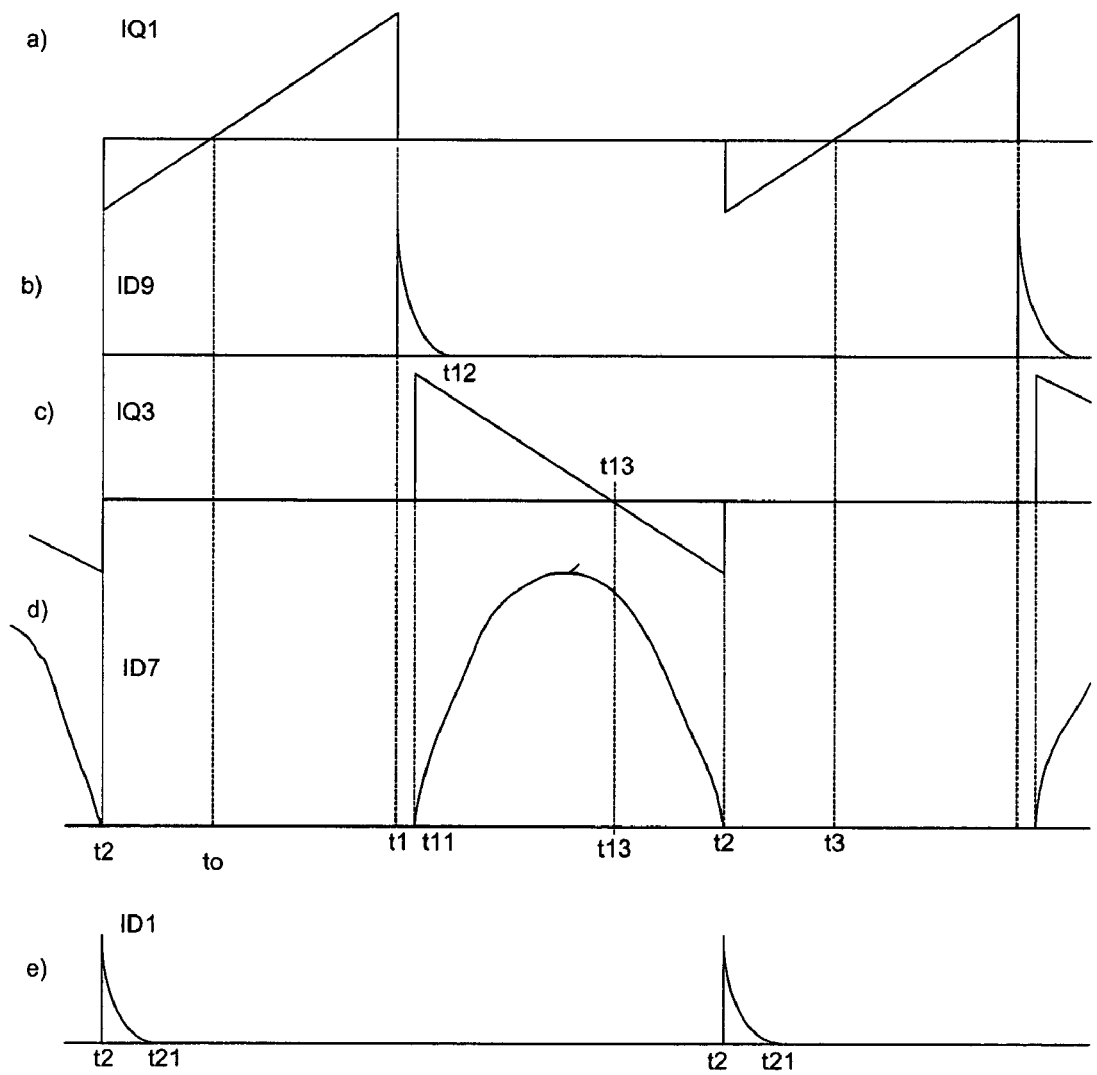
FIG. 18 illustrates voltage waveforms of the converter in FIG. 16.

Equivalent diagrams of the converter 1600 in FIG. 16 are presented in FIGS. 17a–17e, with their waveforms illustrated in FIG. 18. As we can see from the diagrams of FIG. 18, included in the converter 1600 is an active clamp circuit Q3 (1602), W4 (1502), D11 (1503), C1 (902), C2 (903) which enables leakage energy utilization from all involved windings and softswitching of the main and auxiliary switches. It may be designed in a such manner that it changes the shape of the secondary current: from a triangle current on FIG. 6d to a practically half sinusoidal on FIG.

18d, bringing down the secondary RMS current and losses and allowing blocking diode D7 (408) to turn off with 0 current and no ringing.

Figure 19:
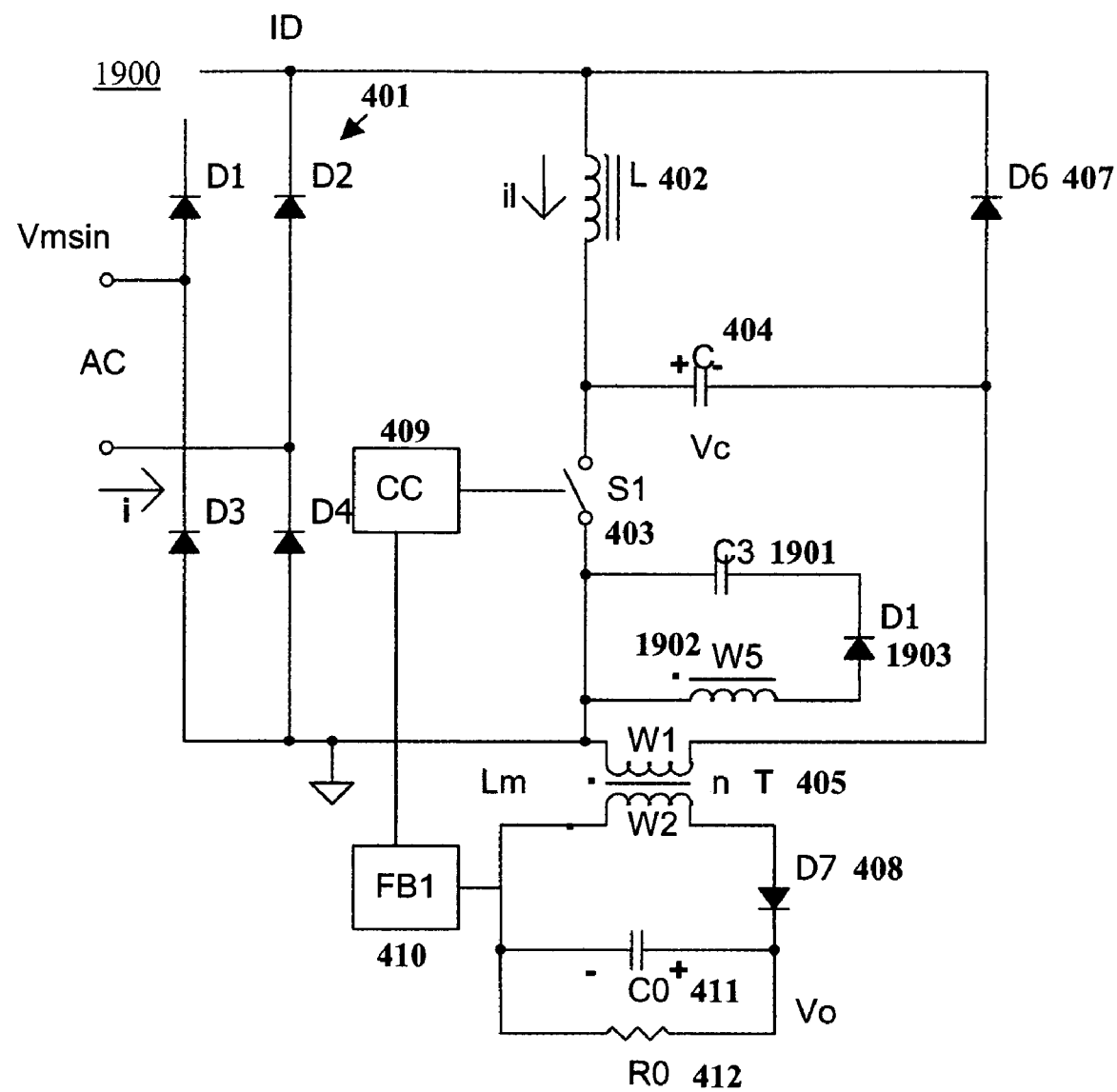
FIG. 19 illustrates an embodiment of an AC/DC converter with a flyback winding for Vcc in accordance with the present invention.

A converter 1900 illustrated in FIG. 19 has a flyback winding W5 (1902) connected through a diode D12 (1903) to the Vcc capacitor C3 (1901). The converter 1900 is another convenient way of generating Vcc voltage.

Another object of the invention is to provide an AC/DC converter with input current shaped by sinusoidal modulation and having voltage across the bulk capacitor constant when the amplitude of input voltage is variable. As it follows from equation (23) that can be achieved if input inductance values are being changed such that:

$$\frac{V_m^2}{L} = const, \text{ or } L = aV_m^2 \quad (39)$$

where a=const, assuming the magnetizing inductance of the transformer Lm (405) is also constant.

Figure 20:
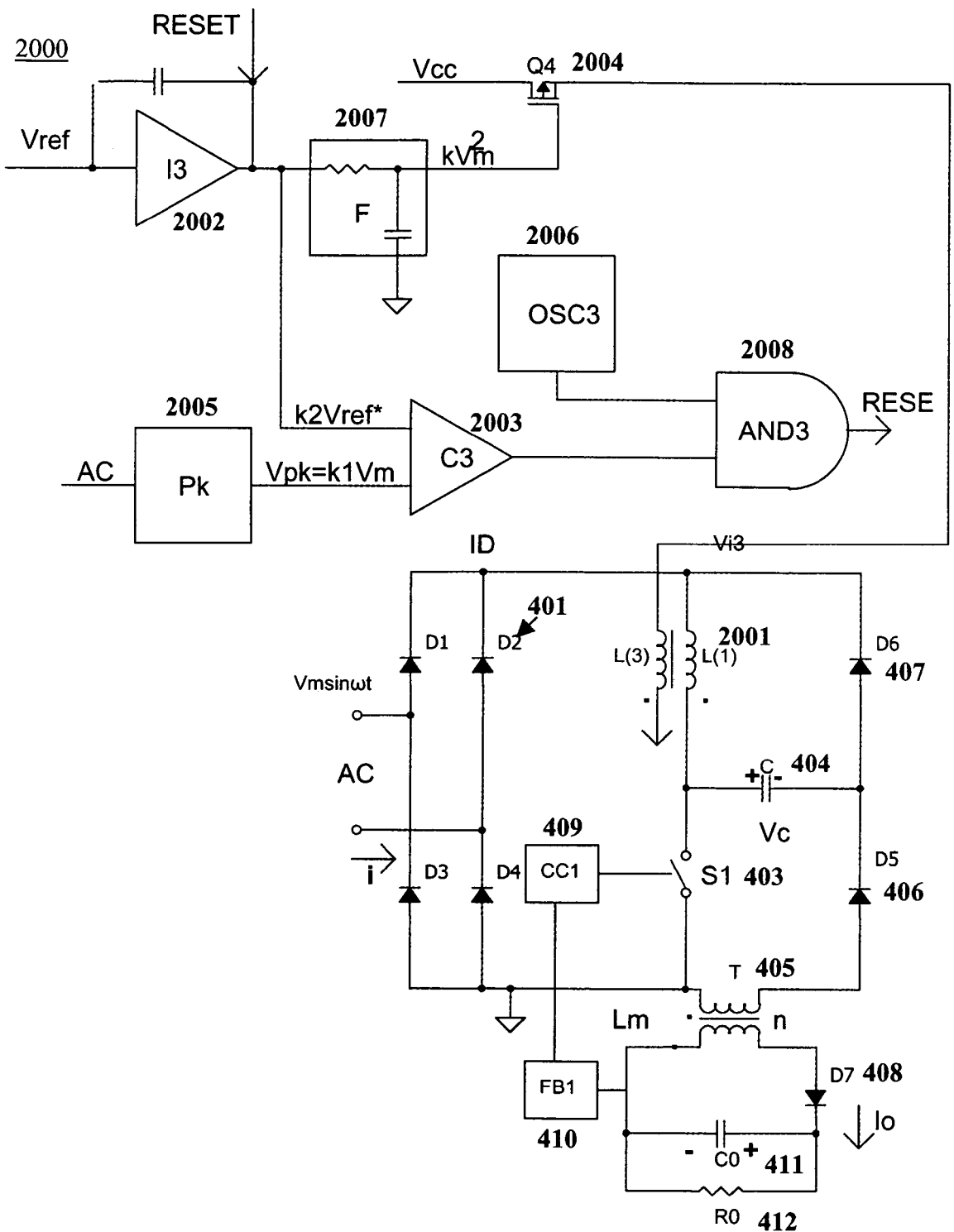
FIG. 20 illustrates an embodiment of an AC/DC converter with the controlled bulk capacitor voltage in accordance with the present invention.

The AC/DC converter 2000 illustrated in FIG. 20 with input current shaped by sinusoidal modulation has a rectifier D1–D4 (401), which is connected with its positive terminal to the first terminal of the input inductor L (2001), and with negative terminal to the ground node. The first terminal of the switch S1 (403) is connected to the second terminal of the input inductor L (2001) and positive terminal of the bulk capacitor C (404). The second terminal of switch S1 (403) is connected to the first terminal of the isolation transformer T (405) and the ground node. The second terminal of transformer T (405) is coupled with the negative terminal of the bulk capacitor C (404) via an isolating diode D5 (406), connected with its anode to the transformer T (405) and the cathode to the bulk capacitor C (404). The negative terminal of the bulk capacitor C (404) is connected to the first terminal of the inductor L (2001) via an isolating diode D6 (407), connected with its anode to the capacitor C (404) and its cathode to inductor L (2001). The secondary winding of the transformer T (405) is coupled to the load (412) via blocking diode D7 (408). The input inductor L (2001) has a secondary winding L(3), which is being used to magnetize the inductor L (2001) and change its inductance to maintain the validity of equation (39). The winding L3 is driven by a control circuit comprising the integrator I3 (2002), comparator C3 (2003), P channel FET Q4 (2004), peak detector Pk (2005), oscillator OSC3 (2006), averaging R—C Filter F (2007), and AND3 circuit (2008).

The peak detector Pk (2005) is connected to the AC input voltage and samples the amplitude of the input voltage. The output signal of the peak detector Pk (2005) is $$V_{pk} = K_1 V_m \quad (40)$$

The input of the integrator I3 (2002) is connected to the reference constant voltage. Output voltage of the integrator I3 (2002) is $$V_{i3} = (K_2 V_{ref})t \quad (41)$$

The comparator C3 (2003) has a set signal equal to Vpk. When output of the integrator I3 (2002) reaches the value of Vpk, the comparator C3 (2003) triggers the logic to start the integrator I3 (2002) reset:

$$K_1 V_m = (K_2 V_{ref})t \quad (42)$$

Finding t from equation (42):

$$t = \frac{K_1 V_m}{K_2 V_{ref}} \quad (43)$$

Average voltage at the output of Filter F (2007):

$$\frac{V_{i3}t}{T} = \frac{K_1 V_m K_1 V_m}{K_2 V_{ref} T} = K V_m^2 \quad (44)$$

Where a constant coefficient K is equal to:

$$K = \frac{K_{12}}{K_2 V_{ref} T} \quad (45)$$

where $K_1$ and $K_2$ are also constant coefficients.

P channel FET Q4 (2004) is working in the linear region regulating its conductance inversely proportional to the signal $KV_m^2$, applied at its gate. The on resistance of Q4 (2004):

$$RQ4 = K_3 V_m^2 \quad (46)$$

And magnetizing current in L(3):

$$IL(3) = \frac{Vcc}{K_3 K V_m^2} \quad (47)$$

is exactly in compliance with equation (39) provided that inductance L(3) is inversely proportional to the magnetizing current, keeping $V_c$=const, while $V_m$ changes.

Figure 21:
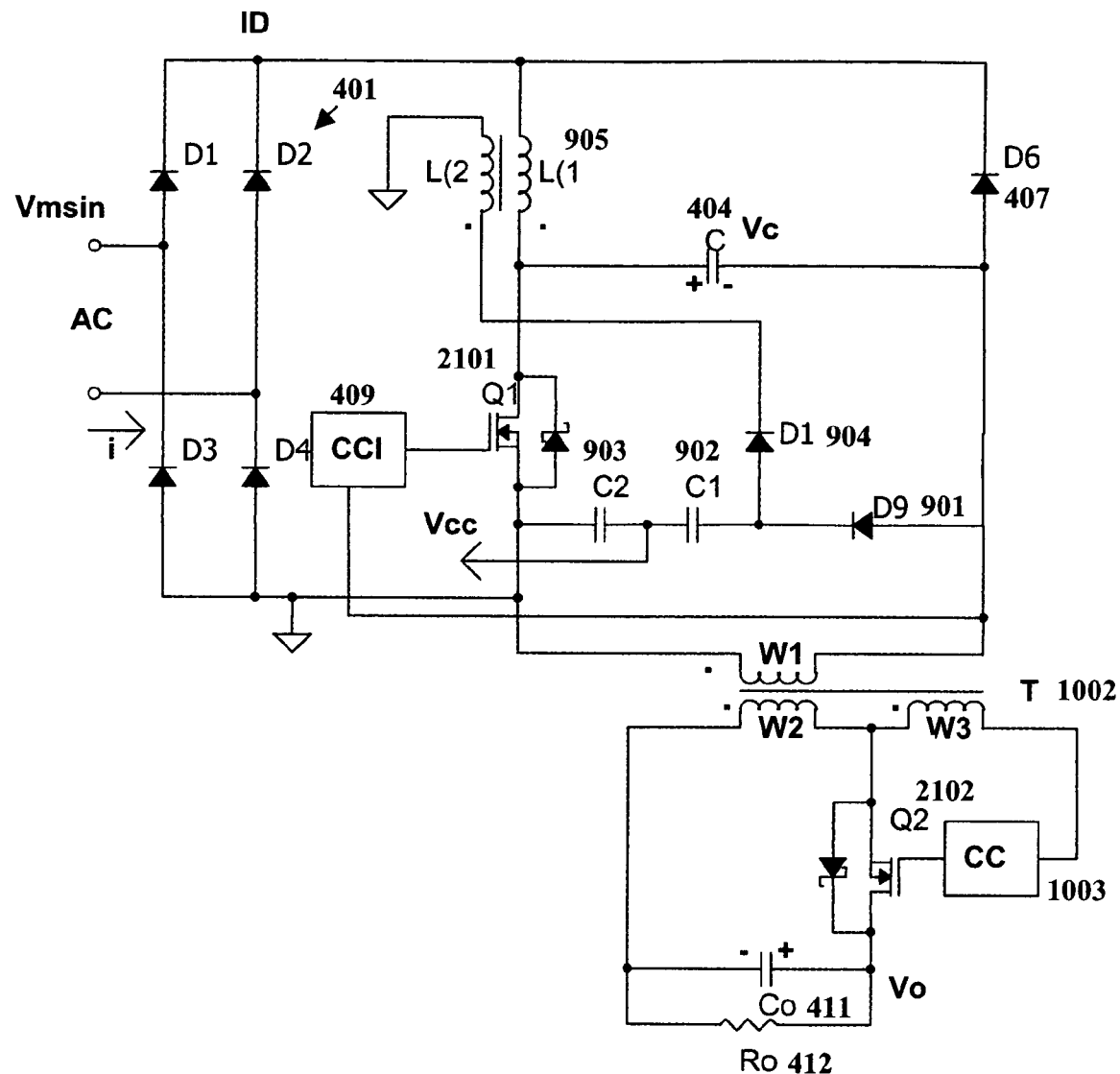
FIG. 21 illustrates an embodiment of an AC/DC converter with the primary side feedback in accordance with the present invention.

Any of the switches S1–S3 in the above embodiments may be substituted by a selection of various types. For example, as illustrated in FIG. 21, MOSFETs (2101 and 2102) may be used as substitutes.

Figure 22:
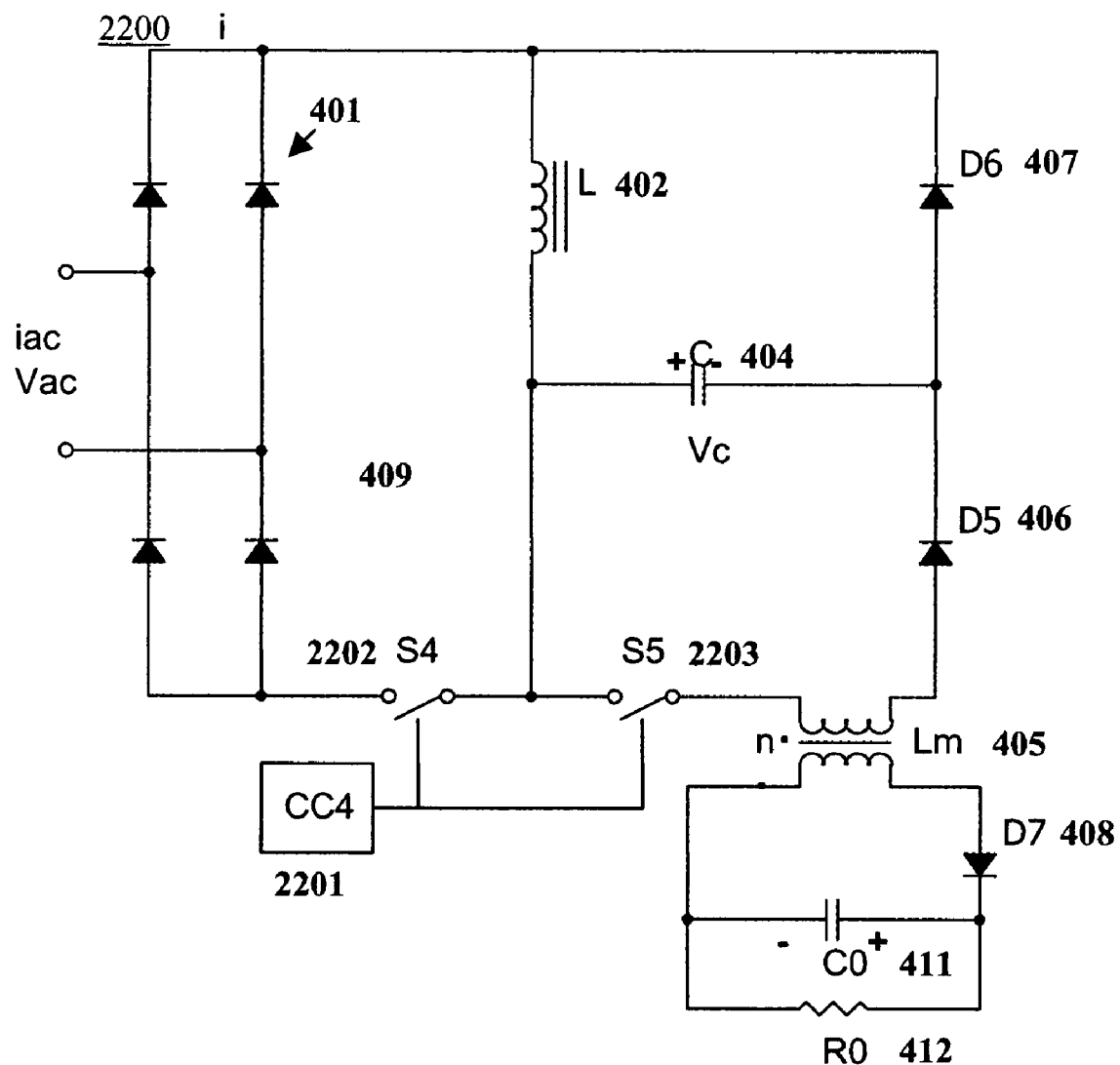
FIG. 22 illustrates an embodiment of an AC/DC converter without low frequency ripple in accordance with the present invention.

Yet another objective of the invention is to provide a switch mode AC/DC converter with input AC current shaped to limit high harmonics content and exclude low frequency ripple voltage from the output voltage. The proposed converter 2200 is illustrated in FIG. 22. An AC/DC rectifier (401) is connected to the first terminal of the input inductor L (402). Second terminal of the inductor L (402) is connected to the positive terminal of the bulk capacitor C (404) and two switches S4 (2202) and S5 (2203), with the first of them (S4 2202) coupled to the negative terminal of the rectifier and the second (S5 2203) to the first terminal of the isolation transformer Lm (405). Second terminal of the isolation transformer Lm (405) is coupled via a diode D5 (406) to the negative terminal of the bulk capacitor C (404). The secondary winding of the isolation transformer Lm (405) is configured in a flyback type of architecture.

Figure 23:
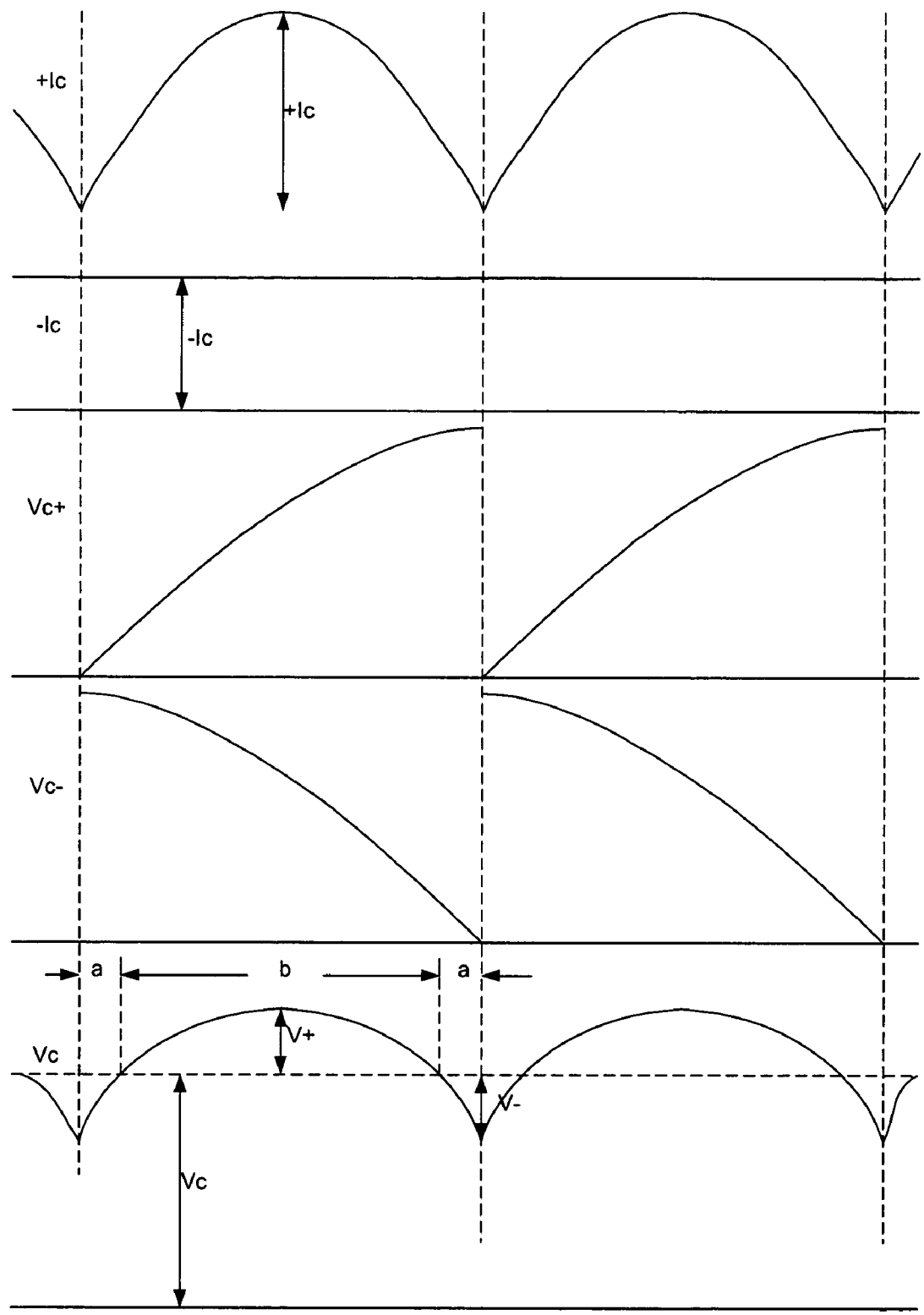
FIG. 23 illustrates voltage ripple across the bulk capacitor in the converter in FIG. 22.

Low frequency ripple appearing across the bulk capacitor C (404) is presented in FIG. 23. Average charging current +Ic within half of a cycle of input voltage is given by equation (32):

$$+Ic = \left(\frac{V_m TD^2}{2L}\right) \sin \omega t \quad (48)$$

Charging capacitor C (404) with this current during half a cycle of input voltage t=π/w would give the following rise of voltage across this capacitor C (404):

$$V_{cm} += \frac{V_m T(D^2)}{\omega LC} \quad (49)$$

The discharging current −Ic is approximated by an average isolation transformer current:

$$-Ic = \frac{V_c T(D^2)}{2Lm} \quad (50)$$

The peak discharge voltage by this current:

$$V_{cm} -= \frac{V_c T(D^2)}{2\omega LmC} \quad (51)$$

Substituting Vm in (49) by Vc from (23), taking difference between Vc+ and Vc− at t=π/2ω, the expression of the relative to Vc amplitude of ripple V+ is found to be:

$$V+r = V_c \left(\frac{T}{16\omega C}\right)\left(\frac{1}{\sqrt{LLm}} - \frac{1}{2L}\right) \quad (52)$$

If a desired ripple is expressed in %, K %, then the correspondent value of capacitance C (404) will be:

$$C = \left(\frac{T}{0.16K\%\omega}\right)\left(\frac{1}{\sqrt{LLm}} - \frac{1}{2L}\right) \quad (53)$$

Figure 24:
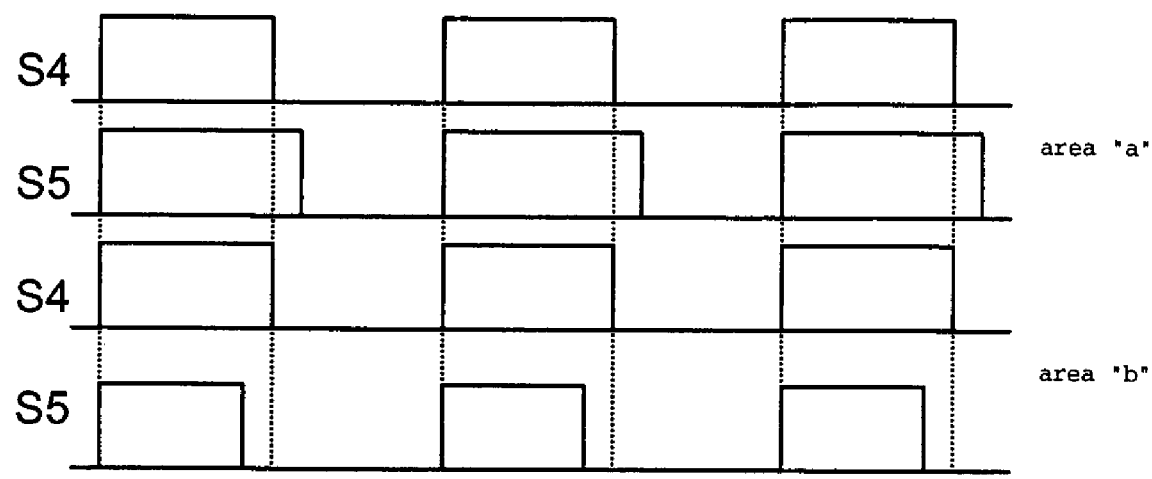
FIG. 24 illustrates switching diagrams of switches S4 and S5 in the converter in FIG. 22.

A numeric analysis of equation (53) shows that the values of C (404) are well within the limits used today in the AC/DC off-line converters with non sinusoidal AC input current. However, the converter 2200 in FIG. 22 corrects this problem. The control circuit CC4 (2201) coupled to switches S4 (2202) and S5 (2203) has two feedbacks which control switches S4 (2202) and S5 (2203) separately: slow S4 (2202) and fast S5 (2203). In average, both duty cycles are equal, however in the area "a", see FIG. 24, where the instantaneous voltage across the capacitor C (404) is less than average Vc, the duty ratio of switch S5 (2203) is higher than switch S4 (2202). In the area "b", when the instantaneous voltage across capacitor C (404) is over Vc, the duty ratio of switch S5 (2203) is smaller than for switch S4 (2202).

The converter 2200 in FIG. 22 is a single stage two switch AC/DC converter. It should be noted that each of the switches S4 (2202) and S5(2203) carries only its circuit share of current, while S1 (403) in the converter 400 of FIG. 4 is stressed by a sum of both currents.

Switches S4 (2202) and/or S5 (2203) may be substituted with other adequate devices, such as N-channel MOSFETs.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A switch mode AC/DC converter, comprising:
   an input inductor, comprising a first terminal and a second terminal;
   a rectifier, comprising a positive terminal coupled to the first terminal of the input inductor, and a negative terminal coupled to a ground node;
   a switch, comprising a first terminal coupled to the second terminal of the input inductor, a second terminal coupled to the ground node, and a control terminal;
   a bulk capacitor, comprising a positive terminal coupled to the first terminal of the switch, and a negative terminal;
   an isolation transformer, comprising a first terminal of a primary winding coupled to the second terminal of the switch, a second terminal of the primary winding coupled to the negative terminal of the bulk capacitor, and a secondary winding coupled to a load;
   an isolating diode, comprising an anode coupled to the negative terminal of the bulk capacitor, and a cathode coupled to the first terminal of the input inductor; and
   a control system coupled to a control terminal of the switch, comprising a feedback loop.

2. The converter of claim 1, wherein the feedback loop comprises an output voltage feedback loop coupled to the secondary winding of the isolation transformer.

3. The converter of claim 1, further comprising:
   a second isolating diode, comprising an anode coupled to the isolation transformer, and a cathode coupled to the bulk capacitor; and
   a blocking diode coupled between the secondary winding of the isolation transformer and the load.

4. The converter of claim 3, further comprising:
   a diode, comprising a cathode coupled to an AC terminal, and an anode; and
   a resister coupled to the anode of the diode and the negative terminal of the bulk capacitor.

5. The converter of claim 1, further comprising a leakage energy recovery circuit, comprising:
   a diode, a first capacitor, and a second capacitor coupled across the primary winding of the isolation transformer.

6. The converter of claim 5, wherein when the switch is off, energy stored in a leakage inductance of the isolation transformer is transferred to the first and second capacitors.

7. The converter of claim 5, further comprising:
   the input inductor further comprising an overwinding coupled to the ground node, wherein the overwinding has same number of turns as a main winding;
   a second isolation diode, comprising an anode coupled to the isolation transformer, and a cathode coupled to the bulk capacitor; and
   a third isolation diode, comprising a cathode coupled to the overwinding of the input inductor, and an anode coupled to a cathode of the diode.

8. The converter of claim 5, further comprising:
   the feedback loop, comprising a closed feedback loop coupled to the primary winding of the isolation transformer; and a synchronous rectifier element coupled between the secondary winding of the isolation transformer and a positive terminal of the output.

9. The converter of claim 8, wherein the synchronous rectifier element comprises:
a second switch, comprising a control terminal coupled to a secondary control circuit, wherein the secondary control circuit is coupled to a second secondary winding of the isolation transformer.

10. The converter of claim 5, further comprising:
a winding, comprising a first terminal coupled to a cathode of the diode and a second terminal;
a second isolation diode, comprising a cathode coupled to the positive terminal of the capacitor, and an anode coupled to the second terminal of the winding; and
an auxiliary switch coupled between the ground node and the anode of the second isolation diode, comprising a control terminal coupled to the control circuit.

11. The converter of claim 10, wherein when the switch turns off, energy stored in a leakage inductance of the primary winding of the isolation transformer is transferred to the first and second capacitors,
wherein if further stored energy is to be recycled, then the inductance of the primary winding of the isolation transformer is transferred to the first and second capacitors through the winding and the auxiliary switch.

12. The converter of claim 10, wherein the auxiliary switch is bi-directional, allowing a flow of energy from the first and second capacitors into the isolation transformer, enabling a softswitching turn on of the switch, wherein a leakage energy of the winding is returned to the bulk capacitor.

13. The converter of claim 10, wherein the auxiliary switch comprises N-type MOSFETs.

14. The converter of claim 1, further comprising:
a flyback winding coupled to a capacitor and the second terminal of the switch;
the capacitor coupled to the second terminal of the switch; and
a diode, comprising a cathode coupled to the capacitor, and an anode coupled to the flyback winding.

15. The converter of claim 1, further comprising:
the input inductor comprising a secondary winding; and
a second control circuit to drive the secondary winding of the input inductor.

16. The converter of claim 15, wherein the second control circuit comprises:
a peak detector with an input comprising an input voltage;
an integrator with an input comprising a reference voltage;
a comparator with an input comprising an output of the peak detector and an output of the integrator;
an averaging R-C filter coupled to the output of the integrator;
a P-channel FET coupled to the filter, a voltage source, and the secondary winding of the input inductor;
an oscillator; and
an AND3 gate with an input comprising an output of the oscillator and an output from the comparator, and with an output comprising a reset signal.

17. The converter of claim 1, further comprising:
a second switch, comprising a first terminal coupled to the second terminal of the input inductor and to the first terminal of the switch, a second terminal coupled to the negative terminal of the rectifier, and a control terminal coupled to the control circuit.

18. The converter of claim 17, wherein the switch is controlled separately from the second switch.

19. A switch mode AC/DC converter, comprising:
an input inductor, comprising a first terminal and a second terminal;
a rectifier, comprising a positive terminal coupled to the first terminal of the input inductor, and a negative terminal coupled to a ground node;
a switch, comprising a first terminal coupled to the second terminal of the input inductor, a second terminal coupled to the ground node, and a control terminal;
a bulk capacitor, comprising a positive terminal coupled to the first terminal of the switch, and a negative terminal;
an isolation transformer, comprising a first terminal of a primary winding coupled to the second terminal of the switch, a second terminal of the primary winding coupled to the negative terminal of the bulk capacitor, and a secondary winding coupled to a load;
a first isolating diode, comprising an anode coupled to the negative terminal of the bulk capacitor, and a cathode coupled to the first terminal of the input inductor;
a control system coupled to a control terminal of the switch, comprising a feedback loop;
a second isolating diode, comprising an anode coupled to the isolation transformer, and a cathode coupled to the bulk capacitor; and
a blocking diode coupled between the secondary winding of the isolation transformer and the load.

20. A switch mode AC/DC converter, comprising:
an input inductor, comprising a first terminal and a second terminal;
a rectifier, comprising a positive terminal coupled to the first terminal of the input inductor, and a negative terminal coupled to a ground node;
a switch, comprising a first terminal coupled to the second terminal of the input inductor, a second terminal coupled to the ground node, and a control terminal;
a bulk capacitor, comprising a positive terminal coupled to the first terminal of the switch, and a negative terminal;
an isolation transformer, comprising a first terminal of a primary winding coupled to the second terminal of the switch, a second terminal of the primary winding coupled to the negative terminal of the bulk capacitor, and a secondary winding coupled to a load;
a first isolating diode, comprising an anode coupled to the negative terminal of the bulk capacitor, and a cathode coupled to the first terminal of the input inductor;
a control system coupled to a control terminal of the switch, comprising a feedback loop;
a second isolating diode, comprising an anode coupled to the isolation transformer, and a cathode coupled to the bulk capacitor;
a blocking diode coupled between the secondary winding of the isolation transformer and the load;
a diode, comprising a cathode coupled to an AC terminal, and an anode; and
a resister coupled to the anode of the diode and the negative terminal of the bulk capacitor.

21. A switch mode AC/DC converter, comprising:
an input inductor, comprising a first terminal, a second terminal, and an overwinding coupled to a ground node, wherein the overwinding has same number of turns as a main winding of the input inductor;

a rectifier, comprising a positive terminal coupled to the first terminal of the input inductor, and a negative terminal coupled to the ground node;

a switch, comprising a first terminal coupled to the second terminal of the input inductor, a second terminal coupled to the ground node, and a control terminal;

a bulk capacitor, comprising a positive terminal coupled to the first terminal of the switch, and a negative terminal;

an isolation transformer, comprising a first terminal of a primary winding coupled to the second terminal of the switch, a second terminal of the primary winding coupled to the negative terminal of the bulk capacitor, and a secondary winding coupled to a load;

a first isolating diode, comprising an anode coupled to the negative terminal of the bulk capacitor, and a cathode coupled to the first terminal of the input inductor;

a control system coupled to a control terminal of the switch, comprising a feedback loop;

a leakage energy recovery circuit, comprising a diode, a first capacitor, and a second capacitor coupled across the primary winding of the isolation transformer;

a second isolation diode, comprising an anode coupled to the isolation transformer, and a cathode coupled to the bulk capacitor; and a third isolation diode, comprising a cathode coupled to the overwinding of the input inductor, and an anode coupled to a cathode of the diode.

22. A switch mode AC/DC converter, comprising:

an input inductor, comprising a first terminal, a second terminal, and an overwinding coupled to a ground node, wherein the overwinding has same number of turns as a main winding of the input inductor;

a rectifier, comprising a positive terminal coupled to the first terminal of the input inductor, and a negative terminal coupled to the ground node;

a switch, comprising a first terminal coupled to the second terminal of the input inductor, a second terminal coupled to the ground node, and a control terminal;

a bulk capacitor, comprising a positive terminal coupled to the first terminal of the switch, and a negative terminal;

an isolation transformer, comprising a first terminal of a primary winding coupled to the second terminal of the switch, a second terminal of the primary winding coupled to the negative terminal of the bulk capacitor, and a secondary winding coupled to a load;

a first isolating diode, comprising an anode coupled to the negative terminal of the bulk capacitor, and a cathode coupled to the first terminal of the input inductor;

a control system coupled to a control terminal of the switch, comprising a closed feedback loop coupled to the primary winding of the isolation transformer;

a leakage energy recovery circuit, comprising a diode, a first capacitor, and a second capacitor coupled across the primary winding of the isolation transformer; and a synchronous rectifier element comprising a second switch, the second switch comprising a control terminal coupled to a secondary control circuit, wherein the second control circuit is coupled to a second secondary winding of the isolation transformer.

23. A switch mode AC/DC converter, comprising:

an input inductor, comprising a first terminal, a second terminal, and an overwinding coupled to a ground node, wherein the overwinding has same number of turns as a main winding of the input inductor;

a rectifier, comprising a positive terminal coupled to the first terminal of the input inductor, and a negative terminal coupled to the ground node;

a switch, comprising a first terminal coupled to the second terminal of the input inductor, a second terminal coupled to the ground node, and a control terminal;

a bulk capacitor, comprising a positive terminal coupled to the first terminal of the switch, and a negative terminal;

an isolation transformer, comprising a first terminal of a primary winding coupled to the second terminal of the switch, a second terminal of the primary winding coupled to the negative terminal of the bulk capacitor, and a secondary winding coupled to a load;

a first isolating diode, comprising an anode coupled to the negative terminal of the bulk capacitor, and a cathode coupled to the first terminal of the input inductor;

a control system coupled to a control terminal of the switch, comprising a feedback loop;

a leakage energy recovery circuit, comprising a diode, a first capacitor, and a second capacitor coupled across the primary winding of the isolation transformer;

a winding, comprising a first terminal coupled to a cathode of the diode and a second terminal;

a second isolation diode, comprising a cathode coupled to the positive terminal of the bulk capacitor, and an anode coupled to the second terminal of the winding; and an auxiliary switch coupled between the ground node and the anode of the second isolation diode, comprising a control terminal coupled to the control circuit.

24. A switch mode AC/DC converter, comprising:

an input inductor, comprising a first terminal and a second terminal;

a rectifier, comprising a positive terminal coupled to the first terminal of the input inductor, and a negative terminal coupled to a ground node;

a switch, comprising a first terminal coupled to the second terminal of the input inductor, a second terminal coupled to the ground node, and a control terminal;

a bulk capacitor, comprising a positive terminal coupled to the first terminal of the switch, and a negative terminal;

an isolation transformer, comprising a first terminal of a primary winding coupled to the second terminal of the switch, a second terminal of the primary winding coupled to the negative terminal of the bulk capacitor, and a secondary winding coupled to a load;

an isolating diode, comprising an anode coupled to the negative terminal of the bulk capacitor, and a cathode coupled to the first terminal of the input inductor;

a control system coupled to a control terminal of the switch, comprising a feedback loop;

a flyback winding coupled to a capacitor and the second terminal of the switch;

the capacitor coupled to the second terminal of the switch; and a diode, comprising a cathode coupled to the capacitor, and an anode coupled to the flyback winding.

25. A switch mode AC/DC converter, comprising:

an input inductor, comprising a first terminal, a second terminal, a primary winding, and a secondary winding;

a rectifier, comprising a positive terminal coupled to the first terminal of the input inductor, and a negative terminal coupled to a ground node;

a switch, comprising a first terminal coupled to the second terminal of the input inductor, a second terminal coupled to the ground node, and a control terminal;

a bulk capacitor, comprising a positive terminal coupled to the first terminal of the switch, and a negative terminal;

an isolation transformer, comprising a first terminal of a primary winding coupled to the second terminal of the switch, a second terminal of the primary winding coupled to the negative terminal of the bulk capacitor, and a secondary winding coupled to a load;

an isolating diode, comprising an anode coupled to the negative terminal of the bulk capacitor, and a cathode coupled to the first terminal of the input inductor;

a first control system coupled to a control terminal of the switch, comprising a feedback loop; and a second control circuit to drive the secondary winding of the input inductor, wherein the second control circuit comprises:
- a peak detector with an input comprising an input voltage,
- an integrator with an input comprising a reference voltage,
- a comparator with an input comprising an output of the peak detector and an output of the integrator,
- an average R-C filter coupled to the output of the integrator,
- a P-channel FET coupled to the filter, a voltage source, and the secondary winding of the input inductor,
- an oscillator, and
- an AND3 gate with an input comprising an output of the oscillator and an output from the comparator, and with an output comprising a reset signal.

26. A switch mode AC/DC converter, comprising:

an input inductor, comprising a first terminal and a second terminal;

a rectifier, comprising a positive terminal coupled to the first terminal of the input inductor, and a negative terminal coupled to a ground node;

a first switch, comprising a first terminal coupled to the second terminal of the input inductor, a second terminal coupled to the ground node, and a control terminal;

a bulk capacitor, comprising a positive terminal coupled to the first terminal of the first switch, and a negative terminal;

an isolation transformer, comprising a first terminal of a primary winding coupled to the second terminal of the first switch, a second terminal of the primary winding coupled to the negative terminal of the bulk capacitor, and a secondary winding coupled to a load;

an isolating diode, comprising an anode coupled to the negative terminal of the bulk capacitor, and a cathode coupled to the first terminal of the input inductor;

a control system coupled to a control terminal of the first switch, comprising a feedback loop; and a second switch, comprising a first terminal coupled to the second terminal of the input inductor and to the first terminal of the first switch, a second terminal coupled to the negative terminal of the rectifier, and a control terminal coupled to the control circuit, wherein the first switch is controlled separately from the second switch.

27. A method for controlling secondary synchronous rectification for a switch mode AC/DC converter, comprising:
(a) coupling a synchronous rectifier element between a secondary winding of an isolation transformer and a positive terminal of an output, wherein a control terminal of the synchronous rectifier element is coupled to a control circuit, wherein an integrator of the control circuit is charged during a positive voltage swing of the secondary winding;
(b) resetting the integrator at a negative swing of the secondary winding, wherein when the integrator reaches zero volts, positive and negative voltseconds of the isolation transformer are balanced;
(c) activating a logic of the control circuit when the integrator reaches zero volts;
(d) turning the synchronous rectifier element off by the activated logic, wherein there is a delay between time logic is activated and time the synchronous rectifier element is turned off, wherein during the delay, negative current is allowed through the synchronous rectifier element, such that a collapse of the voltage across the isolation transformer is delayed; and
(e) sensing an output voltage during a sense window, wherein the sense window comprises the time the integrator reaches zero volts and an end of the delay.

28. A method for controlling secondary synchronous rectification for a switch mode AC/DC converter, comprising:
(a) coupling a synchronous rectifier element between a primary winding of an isolation transformer and a positive terminal of an output, wherein a control terminal of the synchronous rectifier element is coupled to a control circuit, wherein an integrator of the control circuit is charged during a positive voltage swing of the primary winding;
(b) resetting the integrator at a negative swing of the primary winding, wherein when the integrator reaches zero volts, positive and negative voltseconds of the isolation transformer are balanced;
(c) activating a logic of the control circuit when the integrator reaches zero volts;
(d) turning the synchronous rectifier element off by the activated logic, wherein there is a delay between time logic is activated and time the synchronous rectifier element is turned off, wherein during the delay, negative current is allowed through the synchronous rectifier element, such that a collapse of the voltage across the isolation transformer is delayed; and
(e) sensing an output voltage during a sense window as current in a secondary winding of the isolation transformer, wherein the sense window comprises the time the integrator reaches zero volts and an end of the delay.

29. The method of claim 28, wherein the sensing step (e) comprises:
(e1) activating a sample and hold circuit which samples a reflected to primary side output voltage; and
(e2) applying the sampled voltage to an error amplifier.

* * * * *